(12) United States Patent
Jang

(10) Patent No.: US 12,054,103 B2
(45) Date of Patent: Aug. 6, 2024

(54) FLEXIBLE DISPLAY DEVICE FOR VEHICLE

(71) Applicant: HYUNDAI MOBIS CO., LTD., Seoul (KR)

(72) Inventor: Kil Pyung Jang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 93 days.

(21) Appl. No.: 17/880,825

(22) Filed: Aug. 4, 2022

(65) Prior Publication Data

US 2023/0356669 A1 Nov. 9, 2023

(30) Foreign Application Priority Data

May 3, 2022 (KR) .................. 10-2022-0054645

(51) Int. Cl.
*G09G 3/00* (2006.01)
*B60K 35/00* (2006.01)
*B60R 11/02* (2006.01)
*G09F 9/30* (2006.01)
*B60K 35/22* (2024.01)
*B60K 35/53* (2024.01)
*B60K 35/81* (2024.01)
*B60R 11/00* (2006.01)

(52) U.S. Cl.
CPC .......... *B60R 11/0229* (2013.01); *B60K 35/00* (2013.01); *G09F 9/301* (2013.01); *B60K 35/22* (2024.01); *B60K 35/223* (2024.01); *B60K 35/53* (2024.01); *B60K 35/81* (2024.01); *B60R 2011/0082* (2013.01); *B60R 2011/0092* (2013.01)

(58) Field of Classification Search
CPC ...... G09F 9/301; G06F 1/1624; G06F 1/1652; H10K 2102/311; B60K 2370/52; B60K 2370/67; B60K 2370/1533; B60R 11/0235; B60R 2011/0092
See application file for complete search history.

(56) References Cited

U.S. PATENT DOCUMENTS

| 10,203,863 | B2* | 2/2019 | Kwon .................... G06F 1/1652 |
| 10,434,847 | B2 | 10/2019 | Yoshizumi et al. | |
| 10,534,402 | B1* | 1/2020 | Kim ....................... H05K 1/118 |
| 10,617,017 | B2* | 4/2020 | Park ..................... H05K 5/0217 |
| 10,890,947 | B2* | 1/2021 | Choi ....................... G09F 9/301 |

(Continued)

FOREIGN PATENT DOCUMENTS

| CN | 113366558 A | * | 9/2021 |
| DE | 102012101210 A1 | | 8/2013 |

(Continued)

OTHER PUBLICATIONS

Office Action of the corresponding German Patent Application. No. 102022119338.1 dated Jan. 25, 2023.

*Primary Examiner* — Joe H Cheng
(74) *Attorney, Agent, or Firm* — NovoTechIP International PLLC

(57) ABSTRACT

Disclosed is a flexible display device for a vehicle including a casing having an opening defined therein, a display unit capable of being retracted into and extended from the casing through the opening, a display driver for moving the display unit, and a display winder for winding the display unit based on the movement of the display unit.

18 Claims, 26 Drawing Sheets

(56) References Cited

U.S. PATENT DOCUMENTS

| | | | |
|---|---|---|---|
| 11,127,323 B2* | 9/2021 | Kim | G06F 1/1652 |
| 2017/0318688 A1* | 11/2017 | Kim | H05K 5/0017 |
| 2017/0318693 A1* | 11/2017 | Kim | H02K 11/21 |
| 2017/0367198 A1* | 12/2017 | Park | H10K 50/84 |
| 2018/0014415 A1* | 1/2018 | Choi | H05K 5/0247 |
| 2018/0103551 A1* | 4/2018 | Park | H05K 5/0217 |
| 2018/0114471 A1* | 4/2018 | Park | G06F 1/1652 |
| 2018/0341142 A1* | 11/2018 | Choi | H10K 59/122 |
| 2019/0064578 A1* | 2/2019 | Cho | H10K 77/111 |
| 2019/0138058 A1* | 5/2019 | Kwon | G09G 3/22 |
| 2021/0016538 A1* | 1/2021 | Kwon | B32B 15/20 |
| 2021/0200366 A1 | 7/2021 | Bok et al. | |
| 2022/0210935 A1* | 6/2022 | Lee | G06F 1/1601 |
| 2023/0122526 A1* | 4/2023 | Dong | G06F 1/1652 |
| | | | 361/679.27 |

FOREIGN PATENT DOCUMENTS

| | | | | |
|---|---|---|---|---|
| DE | 102014006338 A1 | 11/2015 | | |
| DE | 102016122648 A1 | 5/2018 | | |
| DE | 102018213058 A1 | 3/2020 | | |
| DE | 112014001802 B4 | 8/2022 | | |
| DE | 102022102943 B3 * | 4/2023 | | B60K 35/00 |
| KR | 10-2017-0027163 A | 3/2017 | | |
| KR | 10-2031910 B1 | 10/2019 | | |
| KR | 10-2020-0013549 A | 2/2020 | | |
| KR | 10-2021-0090761 A | 7/2021 | | |
| WO | WO-2018006751 A1 * | 1/2018 | | |

* cited by examiner (a)

(b)

(a)

(b)

FIRST MODE

SECOND MODE

THIRD MODE

FOURTH MODE

FLEXIBLE DISPLAY DEVICE FOR VEHICLE

CROSS-REFERENCE TO RELATED APPLICATIONS

Pursuant to 35 U.S.C. § 119(a), this application claims the benefit of priority to Korean Patent Application No. 10-2022-0054645, filed on May 3, 2022, of which the disclosure is incorporated herein by reference in its entirety.

TECHNICAL FIELD

The present embodiments relate to a flexible display device for a vehicle applicable to vehicles in all fields, and relate to a device that may retract or extend a flexible display that may be curved or bent.

BACKGROUND

A center fascia display of a vehicle may display various visual information about the vehicle. Such a display device is able to be installed on a dashboard of the vehicle disposed in front of a driver's seat and a passenger's seat, and provides various convenient information such as a navigation, vehicle management and manipulation, Internet, entertainment, and the like.

In this regard, there is a mobile display device, and the mobile display device is able to move in up and down directions or in left and right directions relative to the dashboard. As the display moves along a guide, a driver and a passenger on the passenger's seat may selectively use the display. In a case of a pop-up-type display, the display may be stored, and may be extended and used when necessary.

Because an installation position is fixed, in a fixed display, a use of space in the vehicle is limited, and the larger the size of the display, the lower the front visibility. The pop-up style mobile display must have a separate storage space for the display, and as the size of the display increases, a size of the storage space also increases, which limits usability of the vehicle space. In addition, in a case of an LCD screen display, because an entirety of the screen is operated, there is an inefficiency in which all power is used regardless of a degree of exposure of the display.

Therefore, it is required to develop a display device having a shape and a structure capable of multiplying advantages while minimizing such disadvantages. For background technology related thereto, reference may be made to Korean Patent No. 10-0821925 ('Apparatus for driving display').

SUMMARY

Embodiments of the present disclosure are to provide a display device that may save a storage space of a display used in a vehicle.

Embodiments of the present disclosure are to provide a display device that may efficiently retract or extend a display used in a vehicle into or from a storage space.

In addition, embodiments of the present disclosure are to provide a display device that may control a degree of exposure of a display based on a purpose of use of the display.

In addition, embodiments of the present disclosure are to provide a display device that may save power for outputting a display screen.

The technical problems to be solved by the present disclosure are not limited to the aforementioned problems, and any other technical problems not mentioned herein will be clearly understood from the following description by those skilled in the art to which the present disclosure pertains.

One of the embodiments of the present disclosure is a flexible display device for a vehicle including a casing having an opening defined therein, a display unit capable of being retracted into and extended from the casing through the opening, a display driver for moving the display unit, and a display winder for winding the display unit based on the movement of the display unit.

Preferably, the display unit includes a flexible display, a flexible connecting sheet having one side connected to the display and the other side connected to the display winder, and a display cover adhered or attached to rear surfaces of the display and the connecting sheet, the connecting sheet is capable of being wound on the display winder.

Preferably, the flexible display device further includes a guide connected to a position inside the casing and guiding the movement of the display unit, and the guide performs the guide such that a radius of curvature of a moving path of the display unit moves is within a range from 30 mm to 70 mm.

Preferably, the display is a plastic organic light-emitting diode (POLED).

Preferably, the guide includes a curvature guide for guiding the moving path with the radius of curvature formed, and the curvature guide includes a front surface curvature guide in contact with a front surface of the display unit and a rear surface curvature guide in contact with a rear surface of the display unit.

Preferably, the display driver includes a motor connected to a position inside the casing, a worm gear assembly connected to the motor and having a rotation axis parallel to the motor, and a worm wheel assembly connected to the worm gear assembly and having a rotation axis perpendicular to the motor.

Preferably, the display driver includes a first driving arm having one end connected to the worm wheel assembly and the other end connected to the display unit so as to be pivoted by the worm wheel assembly, and further includes a second driving arm having one end connected to the other end of the first driving arm and the other end connected to the display unit, wherein the second driving arm pivots on the same plane as a pivoting plane of the first driving arm, but pivots in a direction opposite to a pivoting direction of the first driving arm.

Preferably, the display winder includes a rotating drum capable of winding the display unit on an outer circumferential surface thereof, and sensor recognition means for sensing a rotational state of the rotating drum.

Preferably, the rotating drum has a rotation spring, and the rotation spring exerts an elastic force in a direction the display unit is wound.

Preferably, the sensor recognition means includes a plurality of sensors, and a sensing portion capable of being sensed by at least one of the plurality of sensors, the sensing portion rotates together with the rotating drum, and one of the plurality of sensors recognizes a state different from a state of the remaining sensors based on the rotational state of the rotating drum.

Preferably, in the display unit, an external exposure range of the display is controlled based on the rotational state of the rotating drum recognized by the sensor recognition means.

Preferably, the display driver controls an operation of the motor based on the rotational state of the rotating drum recognized by the sensor recognition means.

Preferably, the flexible display device further includes a rear protective cover detachable from the rear surface of the display unit and covering the exposed rear surface of the display unit.

According to one of the embodiments of the present disclosure, usability of the interior space of the vehicle is increased by reducing the storage space for the display.

In addition, according to one of the embodiments of the present disclosure, usability of the display may be increased by adjusting the exposure degree of the display, and the power may be saved by only using the exposed portion of the display region.

In addition, according to one of the embodiments of the present disclosure, the flexible display may be retracted into or extended from the storage space while being safely protected.

The effects that may be obtained from the present disclosure are not limited to the effects mentioned above, and other effects not mentioned may be clearly understood by those with ordinary skill in the technical field to which the present disclosure belongs from the description below.

DETAILED DESCRIPTION

Figure 1:
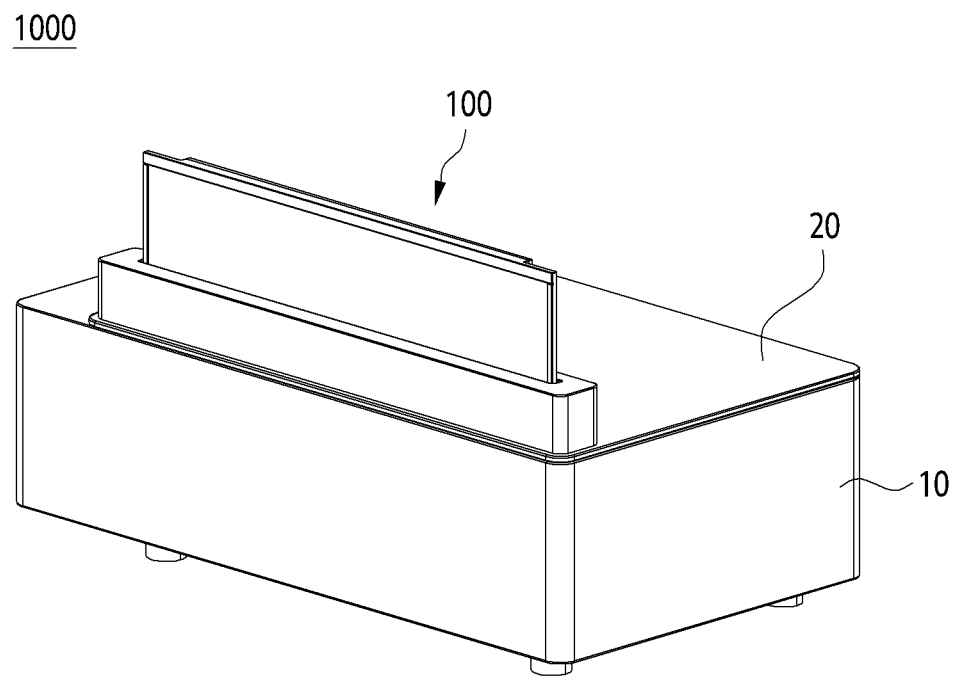
FIG. 1 is a perspective view of a flexible display device for a vehicle according to one embodiment of the present disclosure.

Advantages and features of the present disclosure, and a method for achieving the same, will become apparent with reference to the embodiments described below in detail in conjunction with the accompanying drawings. However, the present disclosure may not be limited to the embodiments disclosed below, but may be implemented in a variety of different forms. The present embodiments are provided only to ensure that the disclosure of the present disclosure is complete, and to completely inform those skilled in the art to which the present disclosure belongs, the scope of the present disclosure. The present disclosure is only defined by the scope of the claims.

The terminology used herein is for the purpose of describing the embodiments only and is not intended to limit the present disclosure. As used herein, the singular forms "a" and "an" are intended to include the plural forms as well, unless the context clearly indicates otherwise. As used herein, "comprises" and/or "comprising" do not exclude the presence or addition of one or more other components in addition to a stated component. Like reference numerals refer to like components throughout the specification, and "and/or" includes each of the mentioned components and every combination of one or more of the components. Although "first", "second", and the like are used to describe various components, it is apparent that such components are not limited by such terms. Such terms are only used to distinguish one component from another. Accordingly, it is apparent that the first component mentioned below may be the second component within the technical spirit of the present disclosure.

Unless otherwise defined, all terms including technical and scientific terms used herein have the same meaning as commonly understood by one of ordinary skill in the art to which the present disclosure belongs. In addition, terms defined in a commonly used dictionary are not to be interpreted ideally or excessively unless specifically defined explicitly.

Spatially relative terms "below", "beneath", "lower", "above", "upper", and the like may be used to easily describe a correlation between one component and other components as shown in the drawings. Spatially relative terms should be understood as terms including different directions of the components during use or operation in addition to directions shown in the drawings. For example, when a component shown in the drawings is flipped, a component described as being located "below" or "beneath" another component may be placed "above" said another component. Accordingly, the exemplary term "below" may include both downward direction and upward direction. Components may also be oriented in other directions, and thus, spatially relative terms may be interpreted based on the orientation.

Figure 2:
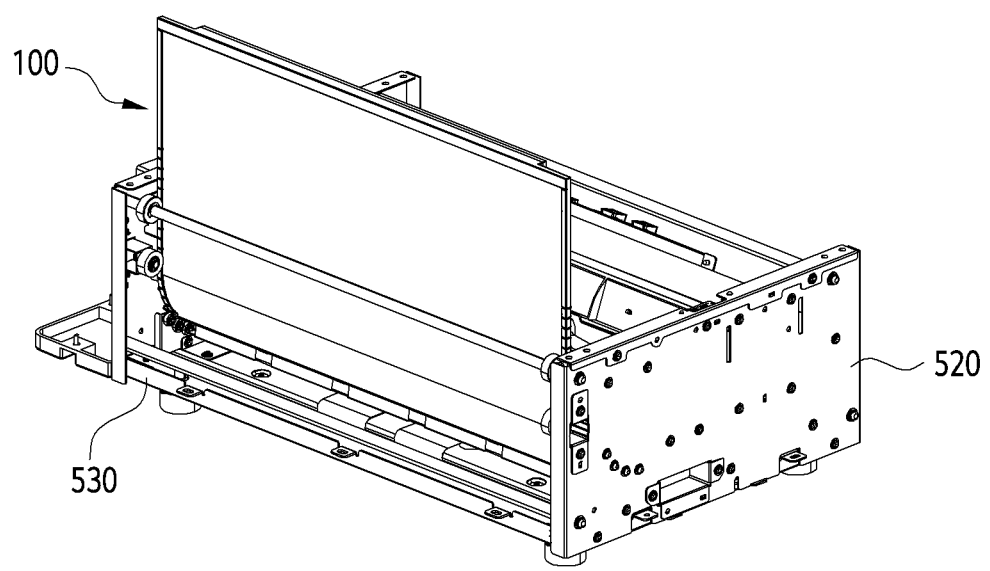
FIG. 2 is a front perspective view showing an interior of a flexible display device for a vehicle according to one embodiment of the present disclosure.

FIG. 1 is a perspective view of a flexible display device (hereinafter, a 'display device') 1000 for a vehicle according to one embodiment of the present disclosure. FIG. 2 is a front perspective view showing an interior of the display device 1000. FIG. 2 shows the display device 1000 in a state excluding a side casing 10 and an upper casing 20 in FIG. 1.

Figure 3A:
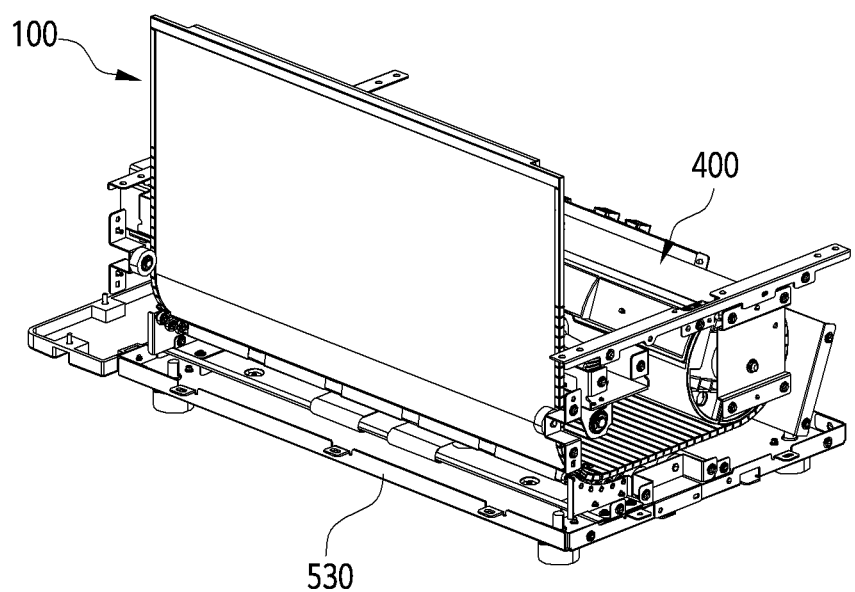
FIG. 3a is a front perspective view showing an interior of a flexible display device for a vehicle according to one embodiment of the present disclosure.
Figure 3B:
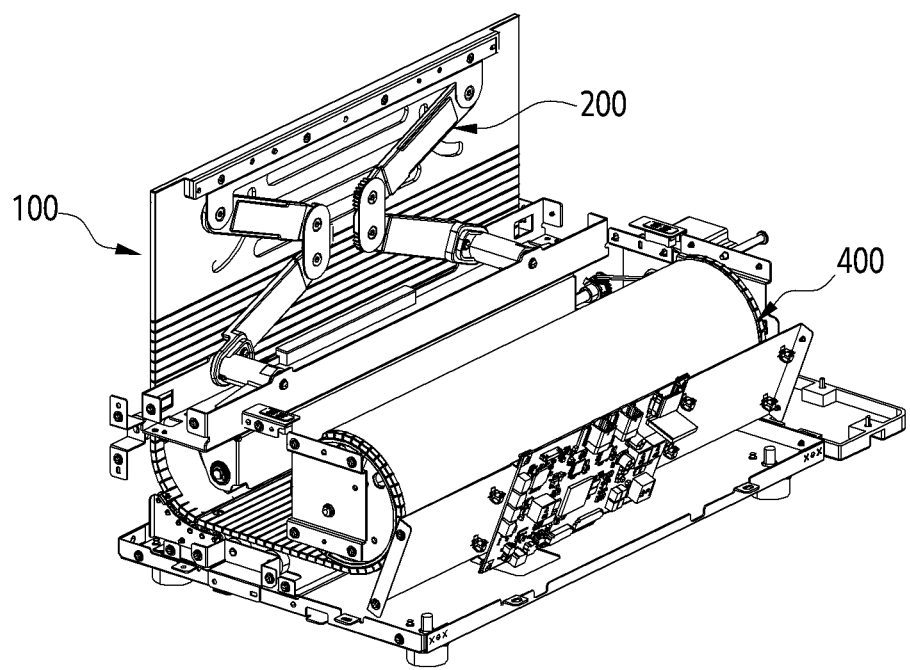
FIG. 3b is a rear perspective view showing an interior of a flexible display device for a vehicle according to one embodiment of the present disclosure.
Figure 4A:
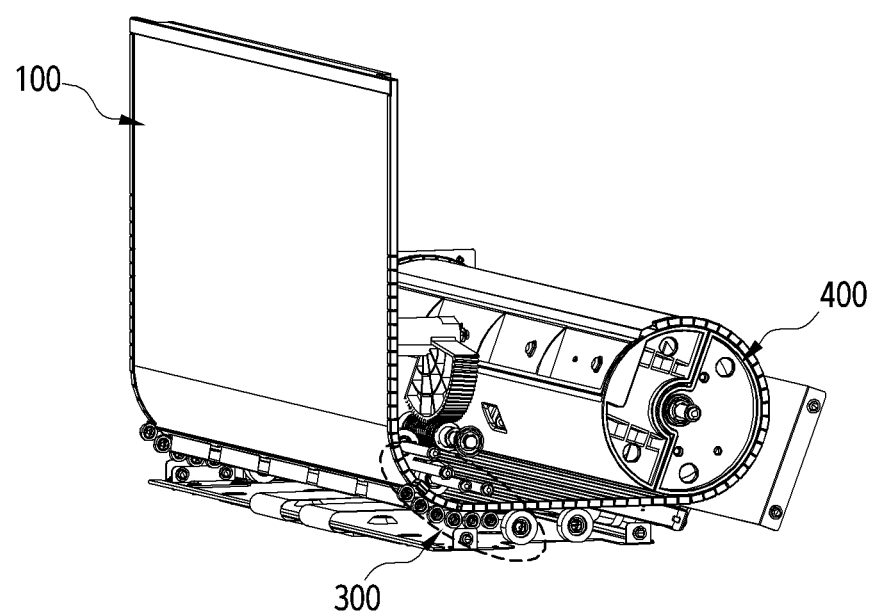
FIGS. 4a and 4b are front perspective views showing an interior of a flexible display device for a vehicle according to one embodiment of the present disclosure.
Figure 4B:
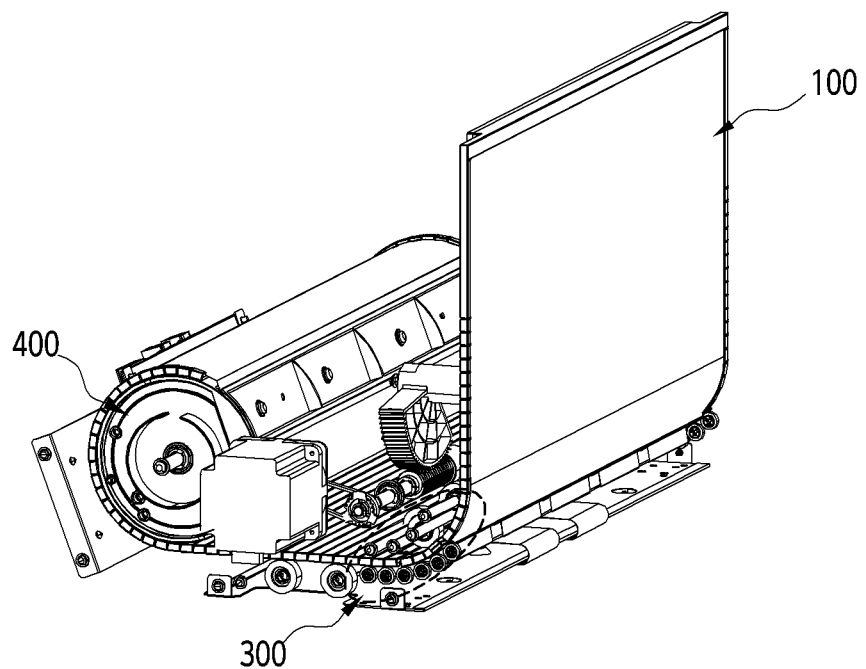
Figure 4C:
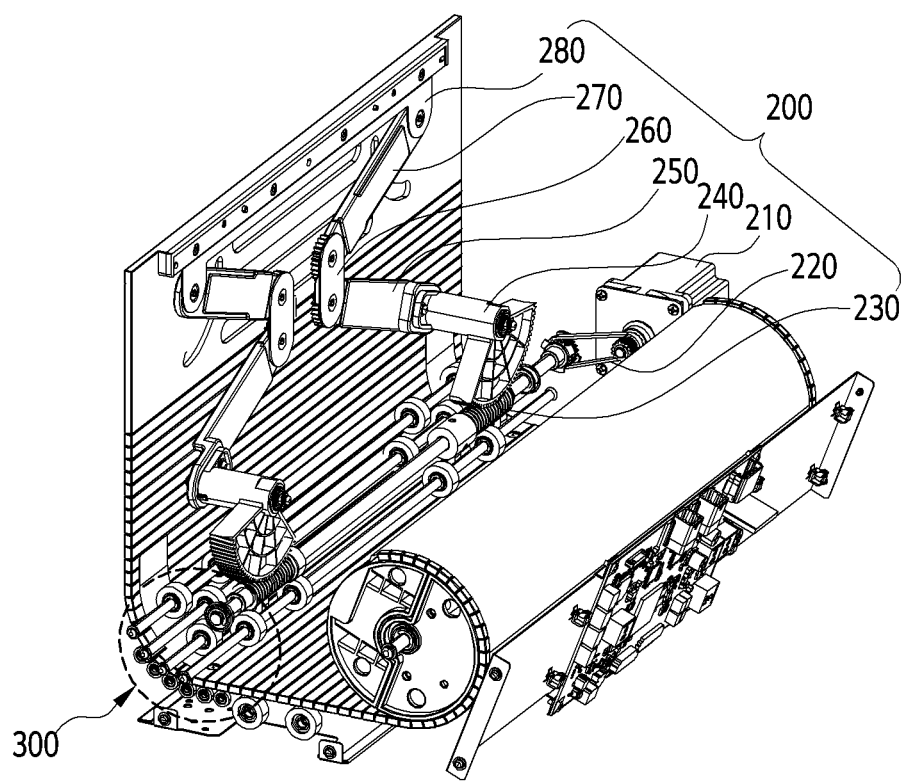
FIGS. 4c and 4d are rear perspective views showing an interior of a flexible display device for a vehicle according to one embodiment of the present disclosure.
Figure 4D:
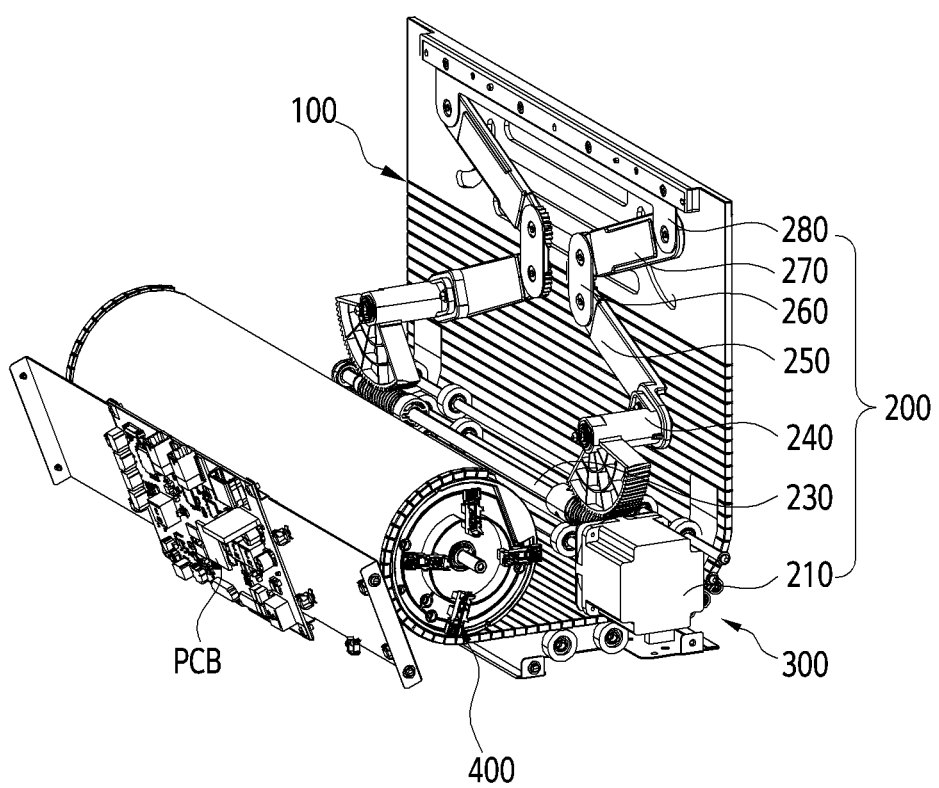

(a) and (b) in FIG. 3 are a front perspective view and a rear perspective view showing an interior of the display device 1000. (a) and (b) in FIG. 3 show the display device 1000 in a state excluding a side fixing frame 520 in FIG. 2.

(a) to (d) in FIG. 4 are front perspective views and rear perspective views showing an interior of the display device 1000. (a) to (d) in FIG. 4 show the display device 1000 in a state excluding a bottom fixing frame 530, a bracket (or a frame), a screw, a clip, a rod (or a bar), and the like for fixing other parts in (a) and (b) in FIG. 3.

The drawings may be expressed in a state in which some components are omitted to describe components located within a casing of the display device 1000, and each drawing may represent the flexible display device for the vehicle according to embodiments of the present disclosure.

Referring to FIGS. 1 to 4 ((a) to (d) in FIG. 4), the display device 1000 may include the casing having an inner space and an opening exposing the inner space, a display unit 100 that may be stored at the inner space of the casing and extended from or retracted into the casing via the opening, a display driver 200 for moving the display unit 100, a guide 300 for guiding the display unit 100, and a display winder 400 for winding the display unit 100.

The casing may include the side casing 10 and the upper casing 20, and the side casing 10 and the upper casing 20 may be assembled with each other. In addition, the casing may include an interior space such that other components may be disposed in the interior space of the casing. The casing includes the opening, and the opening is defined in a size that allows the display unit 100 to be retracted or extended therethrough. The casing protects the components located in the interior space and improves an appearance of the device. A shape of the casing is not limited to that shown in the drawings, and a person with ordinary knowledge in the technical field to which the present disclosure belongs (hereinafter, referred to as a 'person skilled in the art') may appropriately change the shape of the casing within the scope of the technical idea of the present disclosure.

The display unit 100 includes components related to a display screen that displays various information related to the vehicle. For example, the display unit 100 may include a display 110, a connecting sheet 120, and a display cover 130.

Figure 5:
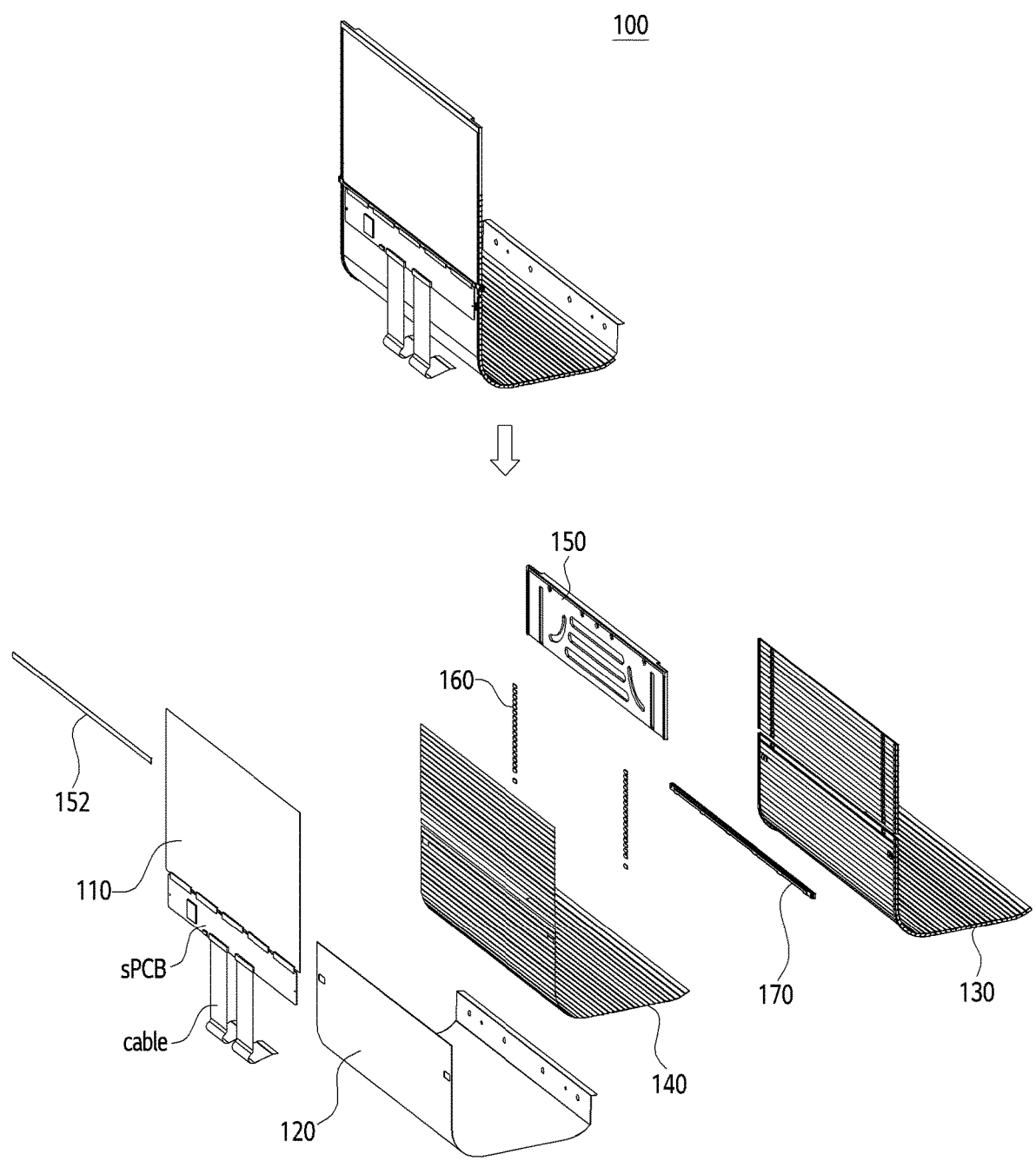
FIG. 5 is an exploded view of a display unit of a display device.

FIG. 5, which is an exploded view of the display unit 100 of the display device 1000, may shows components of the display unit 100.

The display 110 may be a flexible or rollable display 110. The display 110 may be a plastic organic light-emitting diode (POLED). The POLED as an OLED to which a polyimide (PI) substrate, which is a type of plastic, is applied, may realize a curved surface.

The display 110 may be bent, and a radius of curvature at which the display 110 is bent may be at least 50 mm. Preferably, the radius of curvature at which the display 110 is bent may be at least 30 mm. The display 110 may include an LED (light emitting diode, OLED, AMOLED, and PMOLED). A width and a vertical dimension of the display 110 may be appropriately designed by a person skilled in the art.

One side of the connecting sheet 120 is connected to a lower end of the display 110, and the other side thereof is connected to the display winder 400. In addition, the connecting sheet 120 is flexible so as to be wound or unwound via the display winder 400. One side of the connecting sheet 120 may be attached to the display 110 via a double-sided tape. The connecting sheet 120 may be composed of a sheet of a PET material. The material of the connecting sheet 120 may be appropriately selected by the person skilled in the art in in consideration of the flexible characteristics.

The display 110 and the connecting sheet 120 may be connected to each other, and the connecting sheet 120 may be wound or unwound by the display winder 400. Therefore, when the display 110 is retracted into the casing, the display winder 400 winds the connecting sheet 120, and when the display 110 is extended from the casing, the display winder 400 unwinds the connecting sheet 120.

The display cover 130 is a cover that protects rear surfaces of the display 110 and the connecting sheet 120. The display cover 130 may supplement the display 110 and the connecting sheet 120 having no rigidity. The display cover 130 may be composed of a plurality of covers having a great length in a horizontal direction and a small length in a vertical direction. The plurality of covers may be attached to the rear surface of the display 110 or the rear surface of the connecting sheet 120 via a double-sided adhesive portion 140. The double-sided adhesive portion 140 may include the double-sided tape such as a FOAM tape. The double-sided adhesive portion 140 may be applied in a divided manner to the plurality of covers of the display cover 130. A width of the plurality of covers of the display cover 130 may be equal to or greater than a width of the display 110. A vertical dimension of the plurality of covers may be appropriately designed by the person skilled in the art in consideration of whether it is possible to flexibly respond to the bending of the display 110.

The display cover 130 may further include a magnetic portion 160 at each of both distal ends thereof in the horizontal direction. The magnetic portion 160 may utilize a magnetic force for attachment and detachment with a rear protective cover 2210 (see FIG. 18), which will be described later. For example, an externally exposed portion of the display unit 100 may be protected as the rear protective cover 2210 (see FIG. 18) is attached thereto, and a portion of the display unit 100 located within the casing may be separated from the rear protective cover 2210 (see FIG. 18).

The display unit 100 may further include an upper fixing plate 150, an upper end fixing clip 152, and a connected portion reinforcing portion 170.

The upper fixing plate 150 may be a flat plate that is in surface contact with a partial region of an upper end of the rear surface of the display 110. A width of the upper fixing plate 150 may be at least equal to or greater than the width of the display 110. The upper end fixing clip 152 is a component that is connected to the upper fixing plate 150 at an upper end of a front surface of the display 110. An upper end of the display 110 may be fixed by connection of the upper end fixing clip 152 and the upper fixing plate 150. The upper fixing plate 150 and the upper end fixing clip 152 may protect the upper end of the flexible display 110, and the upper fixing plate 150 may be connected to the display driver 200 to be described later to receive power from a motor. In addition, the upper fixing plate 150 and the upper end fixing clip 152 improve the appearance of the display device.

Materials of the upper fixing plate 150 and the upper end fixing clip 152 may contain aluminum (AL). In addition, a material having appropriate rigidity may be applied by the person skilled in the art.

The connected portion reinforcing portion 170 is a component that reinforces a connected portion between the display 110 and a sPCB that is weak.

Figure 6:
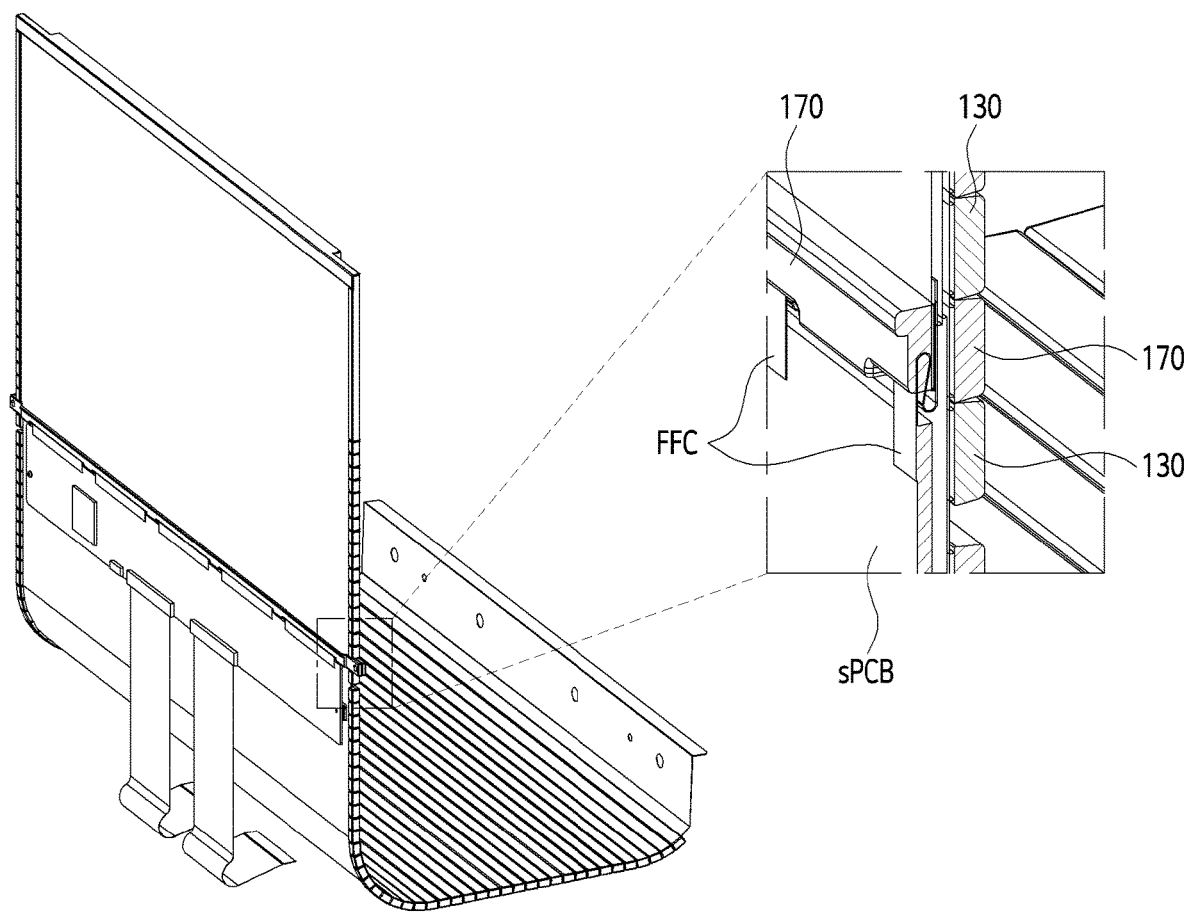
FIG. 6 is an enlarged view of a connected portion of a display unit of a display device.

FIG. 6 is an enlarged view of a connected portion of a lower end of the display 110 for describing the connected portion reinforcing portion 170.

The display 110 may be connected to the sPCB via a flexible flat cable (FFC), and the FFC may be damaged by an external force when the display 110 is moved. Accordingly, the connected portion reinforcing portion 170 may protect the FFC by fixing the FFC on front and rear surfaces of the display 110 or the connecting sheet 120. In the connected portion reinforcing portion 170, two members having a length in the horizontal direction are fastened to each other on the front and rear faces of the display 110 with the display 110 interposed therebetween. The FFC may be fixed by the fastening of the two members, and may maintain a shape thereof that does not receive the external force. The fastening of the two members may be performed via the double-sided tape or screw fastening.

The display 110 may be connected to the sPCB and a cPCB, and final control may be performed by a main PCB.

The display driver 200 is a component for moving the display unit 100.

Figure 7:
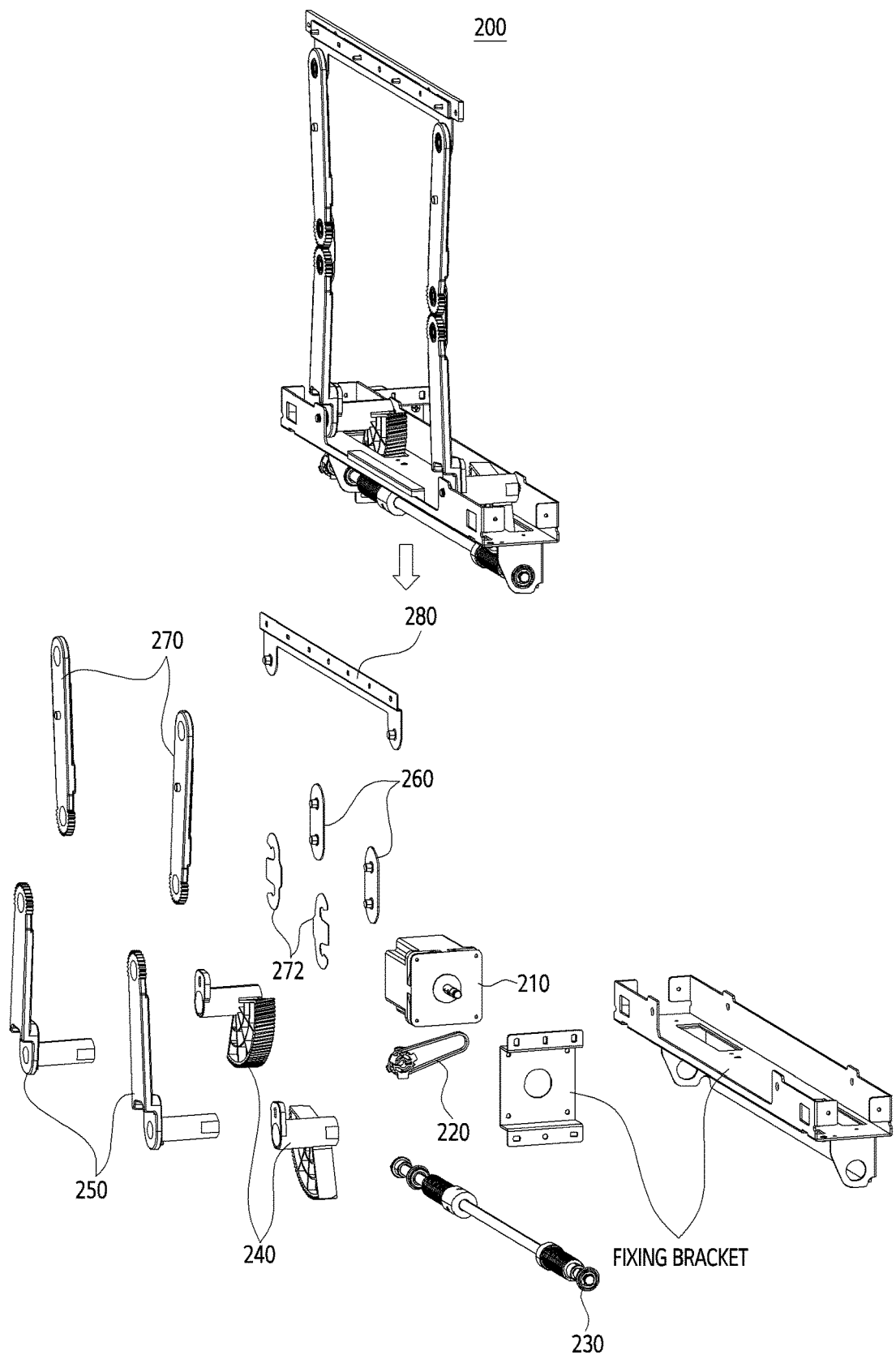
FIG. 7 is an exploded view of a display driver of a display device.

FIG. 7 is an exploded view of the display driver 200. For a configuration of the display driver 200, reference may be made to (c) and (d) in FIG. 4.

The display driver 200 may include a motor 210 connected to the interior of the casing, a worm gear assembly 230 connected to the motor 210, a worm wheel assembly 240 connected to the worm gear assembly 230, a first driving arm 250 connected to the worm wheel assembly 240, and a second driving arm 270 connected to the first driving arm 250.

A rotation of the motor 210 may be controlled by a controller (not shown). For example, an operation of the motor 210 may be controlled for appropriate retraction and extension of the display unit 100. A degree of exposure at which the display unit 100 is extended out of the casing may vary depending on an exposure mode, and the motor 210 may control the operation based on the exposure mode selected by a user to adjust an exposure range of the display unit 100. The motor 210 may be a stepping or hybrid motor.

The worm gear assembly 230 includes a rod rotating with a rotation axis parallel to the motor 210 and a worm gear connected to the rod. The worm gear assembly 230 may rotate by the rotation of the motor 210, and may operate by being connected to the motor 210 with a timing belt 220.

Figure 9:
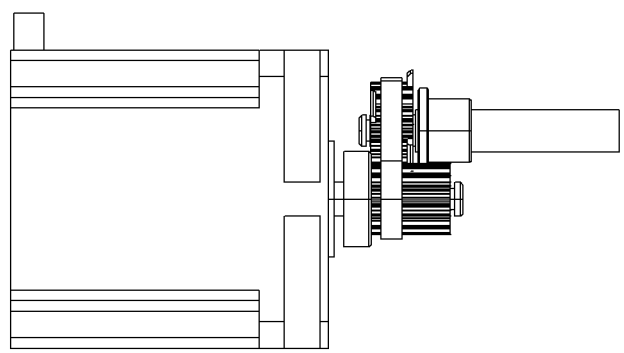
FIG. 9 shows a connected portion of a motor of a display driver.
Figure 9:
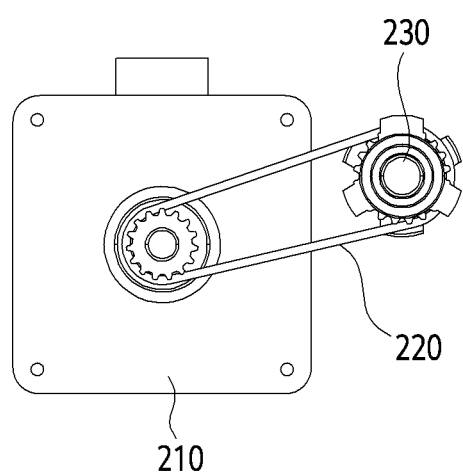

FIG. 9 shows a connected portion of the motor 210 of the display driver 200. The motor 210 may rotate the rod of the worm gear assembly 230 by the timing belt 220.

The worm wheel assembly 240 is connected to the worm gear assembly 230 and includes a worm wheel gear having a rotation axis perpendicular to the rotation axis of the motor 210 or the worm gear assembly 230. As shown in (c) in FIG. 4, because a direction of the rotation axis of the motor 210 is the horizontal direction that is a left and right direction of the display device 1000, a direction of a rotation axis of the worm wheel assembly 240 may be a direction perpendicular to the exposed surface of the display 110. The worm wheel assembly 240 may rotate on a virtual plane parallel to the surface of the display 110 by the rotation of the motor 210.

The first driving arm 250 is a component that has one end connected to the worm wheel assembly 240 and pivots based on the rotation of the worm wheel assembly 240. The first driving arm 250, as an arm member having a predetermined length, may pivot on the virtual plane parallel to the exposed surface of the display unit 100. In addition, the first driving arm 250 is positioned adjacent to the rear surface of the display unit 100.

One end of the second driving arm 270 is pivotably connected to the other end of the first driving arm 250, and the other end of the second driving arm 270 is pivotably connected to the upper end of the display unit 100. The first driving arm 250 and the second driving arm 270 are connected to each other in a form in which sawtooth are engaged with each other as shown in the drawing. The first driving arm 250 and the second driving arm 270 are connected to each other by gears (e.g., spur gears), so that, when the first driving arm 150 pivots, the second driving arm 270 also pivots. Accordingly, the second driving arm 270 may pivot based on to the rotation of the worm wheel assembly 240.

The second driving arm 270, as an arm member having a predetermined length, may pivot on the virtual plane parallel to the exposed surface of the display unit 100. That is, the second driving arm 270 may pivot on the same plane as the pivoting plane of the first driving arm 250. However, the second driving arm 270 pivots in a direction opposite to a pivoting direction of the first driving arm 250. For example, when the first driving arm 250 pivots clockwise, the second driving arm 270 may pivot counterclockwise. The second driving arm 270 may be located adjacent to the rear surface of the display unit 100, and a movement of the second driving arm 270 may be guided by a guide unit disposed on the upper fixing plate 150.

As shown in (c) in FIG. 4, the upper fixing plate 150 may include a groove for guiding the second driving arm 270. Although not shown, the upper fixing plate 150 may include a groove for guiding the first driving arm 250.

The display driver 200 may further include an arm joint 260 for fixing a connected state between the first driving arm 250 and the second driving arm 270. The arm joint 260 functions to ensure that the saw teeth of the first driving arm 250 and the sawtooth of the second driving arm 270 are engaged with each other well and the connection is not released.

A joint spacer 262 for removing a play caused by an assembly step may be added at the connected portion between the first driving arm 250, the second driving arm 270, and the arm joint 260. The spacer 262 may be positioned at a gap between the first driving arm 250 and the arm joint 260 and between the second driving arm 270 and the arm joint 260, so that the above-described play may be eliminated. The joint spacer 262 minimizes an inclination in a front and rear direction of the display unit 100 that may occur when the display unit 100 is extended to the maximum.

The worm wheel assemblies 240, the first drivers 250, and the second drivers 270 may be vertically symmetrical with respect to a center of the display unit 100. That is, the display driver 200 may include a pair of first drivers 250 that are vertically symmetrical, a pair of second drivers 270 that are vertically symmetrical, and a pair of worm wheel assemblies 240 that are vertically symmetrical.

In this regard, pivoting directions of the pair of first drivers 250 are opposite to each other, and pivoting directions of the pair of second drivers 270 are opposite to each other.

The other ends of the pair of second drivers 270 may be pivotably connected to the upper end of the display unit 100, and an upper arm joint 280 for connection with the second drivers 270 may be disposed at the upper end of the display unit 100. The upper arm joint 280, as a component having a predetermined length in the horizontal direction, has both ends pivotably connected to the other ends of the pair of second drivers 270, respectively. The upper arm joint 280 is connected to the upper end of the upper fixing plate 150 of the display unit 100.

The first driver 250 and the second driver 270 may contain a metal material and the metal material may be aluminum (AL). Materials of the arm joint 260 and the upper arm joint 280 may include SUM prescribed in Steel Electrolytic Cold Commercial (SECC) or Korean Industrial Standards (KS). A material of the joint spacer 262 includes PET. A material of the worm wheel gear may include polyoxymethylene (POM), and a material of the worm gear may include brass.

Hereinafter, a movement of the display driver 200 will be described.

Figure 8:
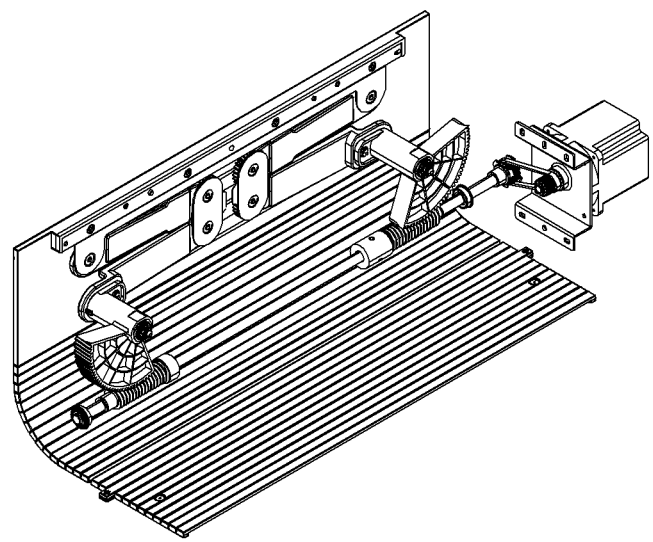
FIG. 8 is a diagram for illustrating an operation process of a display driver of a display device.
Figure 8:
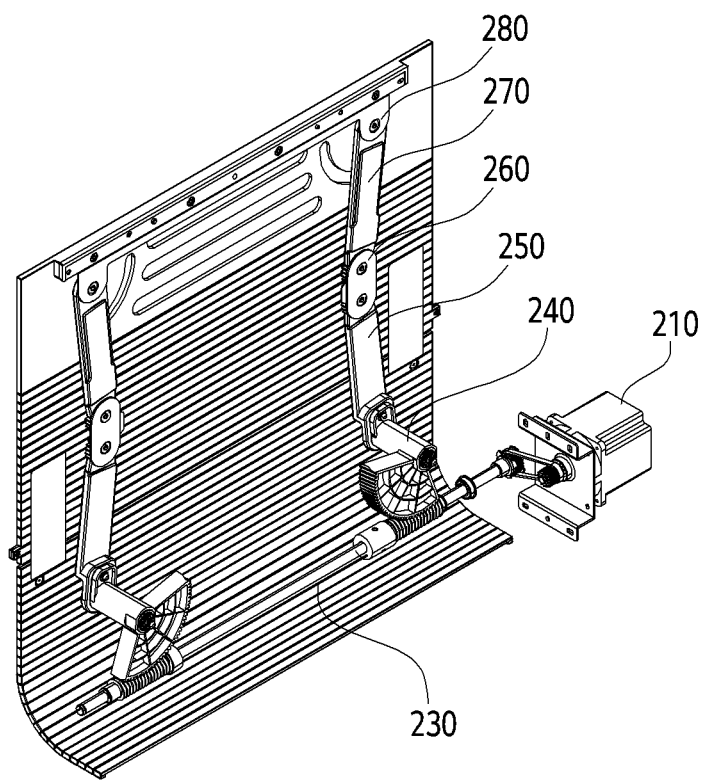

FIG. 8 is a diagram for illustrating an operation process of the display driver 200 of the display device 1000. (a) in FIG. 8 shows the display driver 200 in a state in which the display unit 100 is not exposed, and (b) in FIG. 8 shows the display driver 200 in a state in which the display unit 100 is maximally exposed.

When describing a process in which the display unit 100 is extended from (a) to (b) in FIG. 8, the worm gear worm gear assembly 230 rotates by the rotation of the motor 210. When the worm gear assembly 230 rotates, the pair of worm wheel assemblies 240 rotate clockwise and counterclockwise, respectively. Each of the pair of first drivers 250 pivots in the same direction as each of the pair of worm wheel assemblies 240. Accordingly, the other end (a portion connected with the second driver) of the first driver 250 gradually ascends, and the second driver 270 connected to the first driver 250 pivots in a direction opposite to that of the first driver 250. The other end (a portion connected with the upper arm joint 280) of the second driver 270 is pivotably connected to a point of the upper end of the rear surface of the display unit 100. Accordingly, the second driver 270 lifts the display unit 100.

A process in which the display unit 100 is retracted from (b) to (a) in FIG. 8 may be performed as the motor 210 rotates in a direction opposite to that described above.

Figure 10:
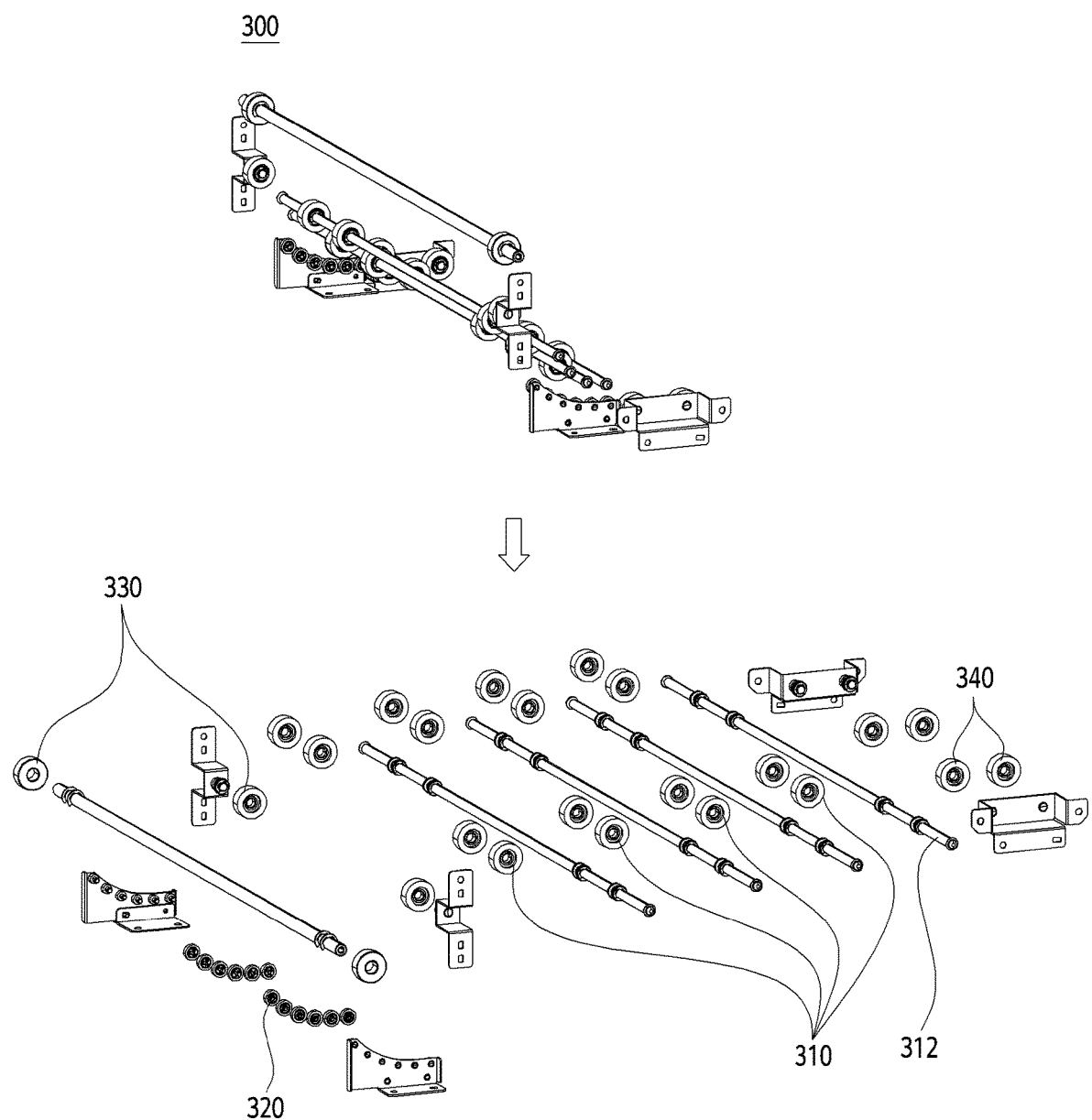
FIG. 10 is an exploded view of a display device.
Figure 11:
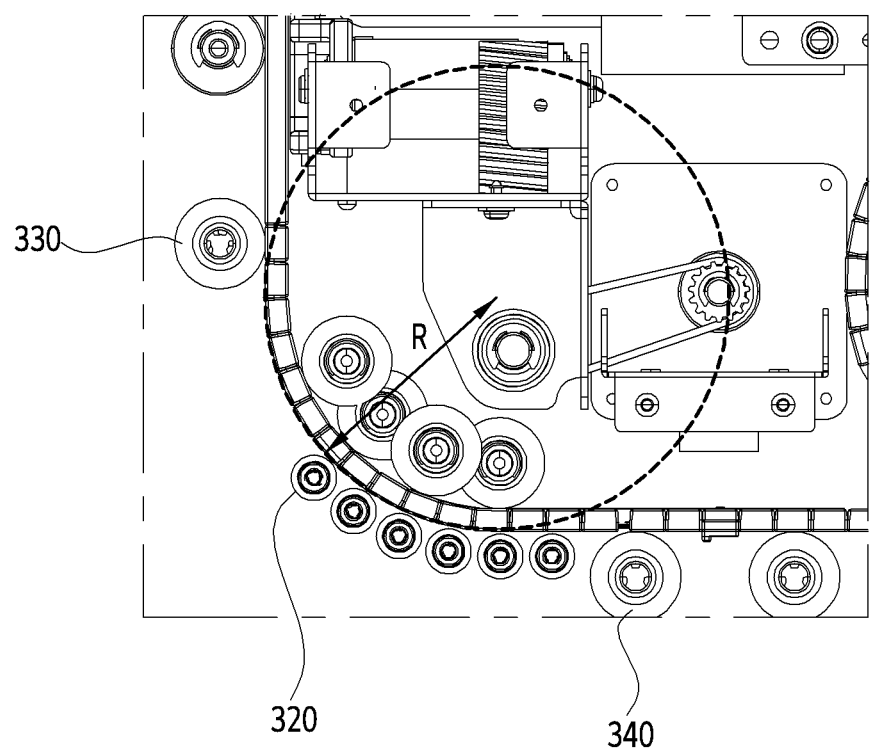
FIG. 11 shows a state in which a guide is disposed inside a display device.

FIG. 10 is an exploded view of the guide 300 of the display device 1000, and FIG. 11 shows a state in which the guide 300 is disposed.

The guide 300 is a component that is connected to the interior of the casing and guides the movement of the display unit 100. The guide 300 may perform the guide such that a radius of curvature of a moving path of the display unit 100 is within a range from about 30 mm to about 70 mm. Preferably, the guide 300 may perform the guide such that a radius of curvature R of the moving path of the display unit 100 is within a range from 45 mm to 55 mm. The display unit 100 may be bent based on the radius of curvature guided by the guide 300 while being retracted into the casing or extended from the casing.

The guide 300 may include a curvature guide for guiding the moving path having the radius of curvature formed, and the curvature guide may include a front surface curvature guide 310 in contact with the front surface of the display unit 100 and a rear surface curvature guide 320 in contact with the rear surface of the display unit 100. Each of the front curvature guide 310 and the rear surface curvature guide 320 may include a plurality of rollers. A size, a shape, and the like of the roller may be appropriately selected by the person skilled in the art.

The curvature guide of the guide 300 may be composed of a plurality of rollers connected to a guide fixing bar 312 disposed in the left and right direction in the internal space of the casing, or may be composed of a plurality of rollers fixed to various frames or brackets of a parts fixing portion 500 (see FIG. 15) within the casing.

In addition, the guide 300 may further include a first straight guide 330 and a second straight guide 340 for guiding the display unit 100 in the vertical or horizontal direction. Referring to FIG. 11, the first straight guide 330 guides the display unit 100 in the vertical direction, and the second straight guide 340 guides the display unit 100 in the horizontal direction.

A material of the plurality of rollers may include rubber or polyoxymethylene (POM). In addition, a material of the frame or the bracket for fixing the rollers may include the SUM prescribed in the Steel Electrolytic Cold Commercial (SECC) or the Korean Industrial Standards (KS).

In one example, the guide 300 may perform a guide function in a scheme different from that shown in the drawing. The person skilled in the art may apply a known guide scheme, and the guide scheme of the guide 300 of the present specification may include the known guide scheme.

Figure 12:
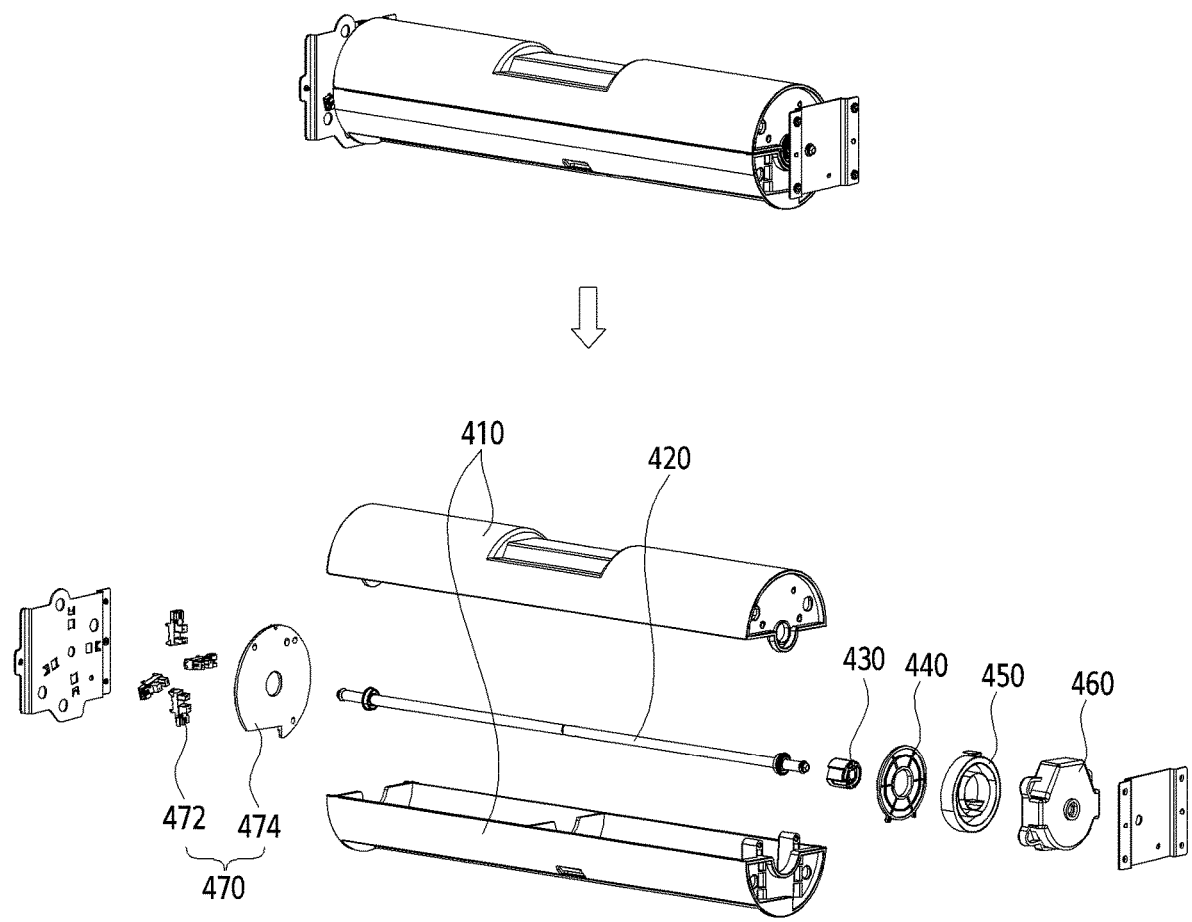
FIG. 12 is an exploded view of a display winder of a display device.

FIG. 12 is an exploded view of the display winder 400 of the display device 1000.

The display winder 400 is a component that may wind the display unit 100 based on the retraction/extraction of the display unit 100. The display winder 400 includes a rotating drum 410 and sensor recognition unit 470 for sensing a rotational state of the rotating drum 410.

The rotating drum 410 rotates with a drum rotation shaft 420 installed within the casing in the left and right horizontal direction as a rotation shaft. In addition, the rotating drum 410 may have a cylindrical shape, and the display unit 100 may be wound or unwound on an outer circumferential surface of the cylindrical shape. The rotating drum 410 may include a rotation spring 450. The rotation spring 450 applies an elastic force such that the rotating drum 410 rotates in a direction in which the display unit 100 is wound. Accordingly, the display unit 100 may be pulled downward by the elastic force applied by the rotation spring 450, and the display screen may be maintained flat by a tensile force of pulling the display unit 100.

The rotating drum 410 may further include a spring case 460, a cap 440 and a holder 430. The spring case 460 is a case having an internal space defined therein for containing the rotating spring 450, and the cap 440 is a component for covering one surface of the spring case 460 containing the rotating spring 450 therein. The holder 430 is a component for fixing positions of the components (the spring case and the cap) related to the rotating spring 450.

The sensor recognition unit 470 senses the rotational state of the rotating drum 410. The sensor recognition unit 470 may include a plurality of sensors 472 and a sensing portion 474 sensed by the plurality of sensors. The sensing portion 474 may rotate together with the rotating drum 410, and may be sensed by at least one of the plurality of sensors 472.

Sensing states of the plurality of sensors 472 may be different based on the rotational state of the rotating drum 410, and the operation of the motor 210 may be controlled based on the sensing states of the plurality of sensors 472. In other words, one of the plurality of sensors 472 may recognize a state different from that of the other sensors based on the rotational state of the rotating drum 410, and the operation of the motor 210 may be controlled accordingly.

A material of the rotating drum 410 may include acrylonitrile butadiene styrene (ABS), materials of the spring case 460, the cap 440, and the holder 430 may include polyoxymethylene (POM), and a material of the rotation spring 450 may include SUS. A material of the bracket related to the display winder 400 includes the Steel Electrolytic Cold Commercial (SECC).

Figure 13:
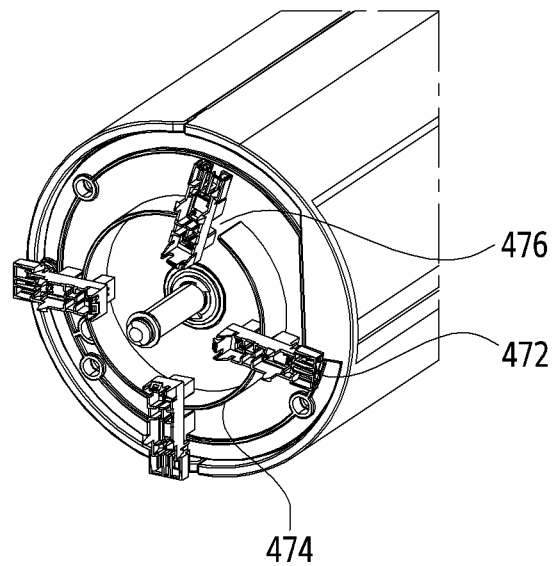
FIG. 13 is a diagram for illustrating exposure control of a display based on rotation of a display winder.
Figure 13:
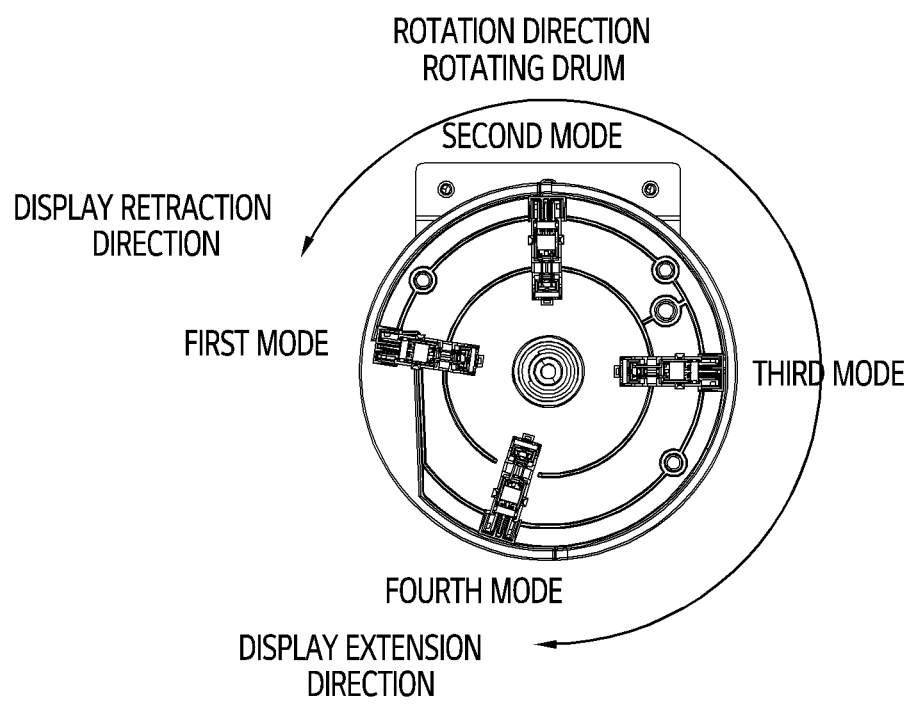
Figure 14A:
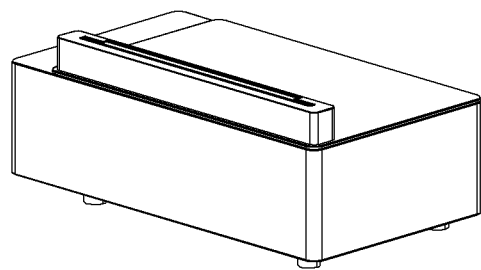
FIGS. 14a, 14b and 14c are diagrams for illustrating a movement of a display driver based on an exposure mode of a display.
Figure 14A:
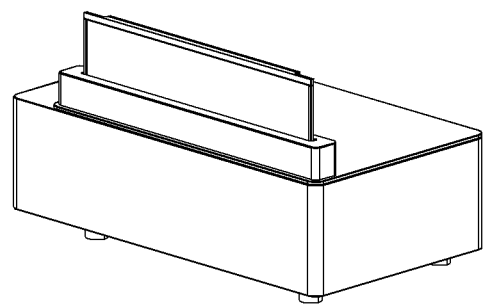
Figure 14A:
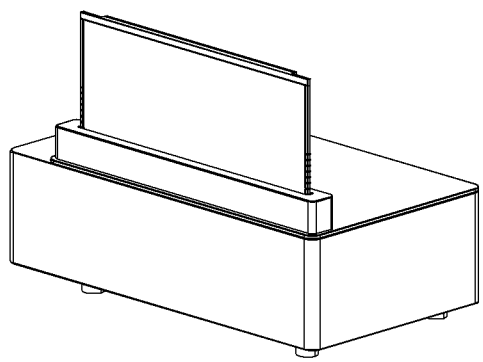
Figure 14A:
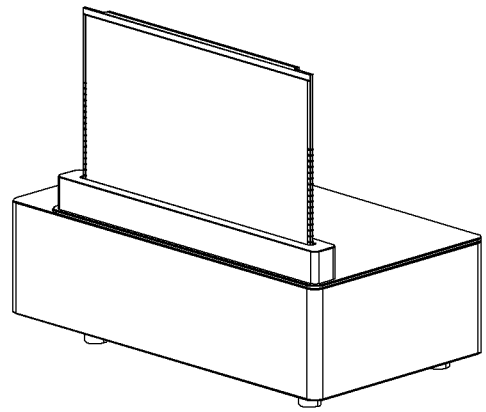
Figure 14B:
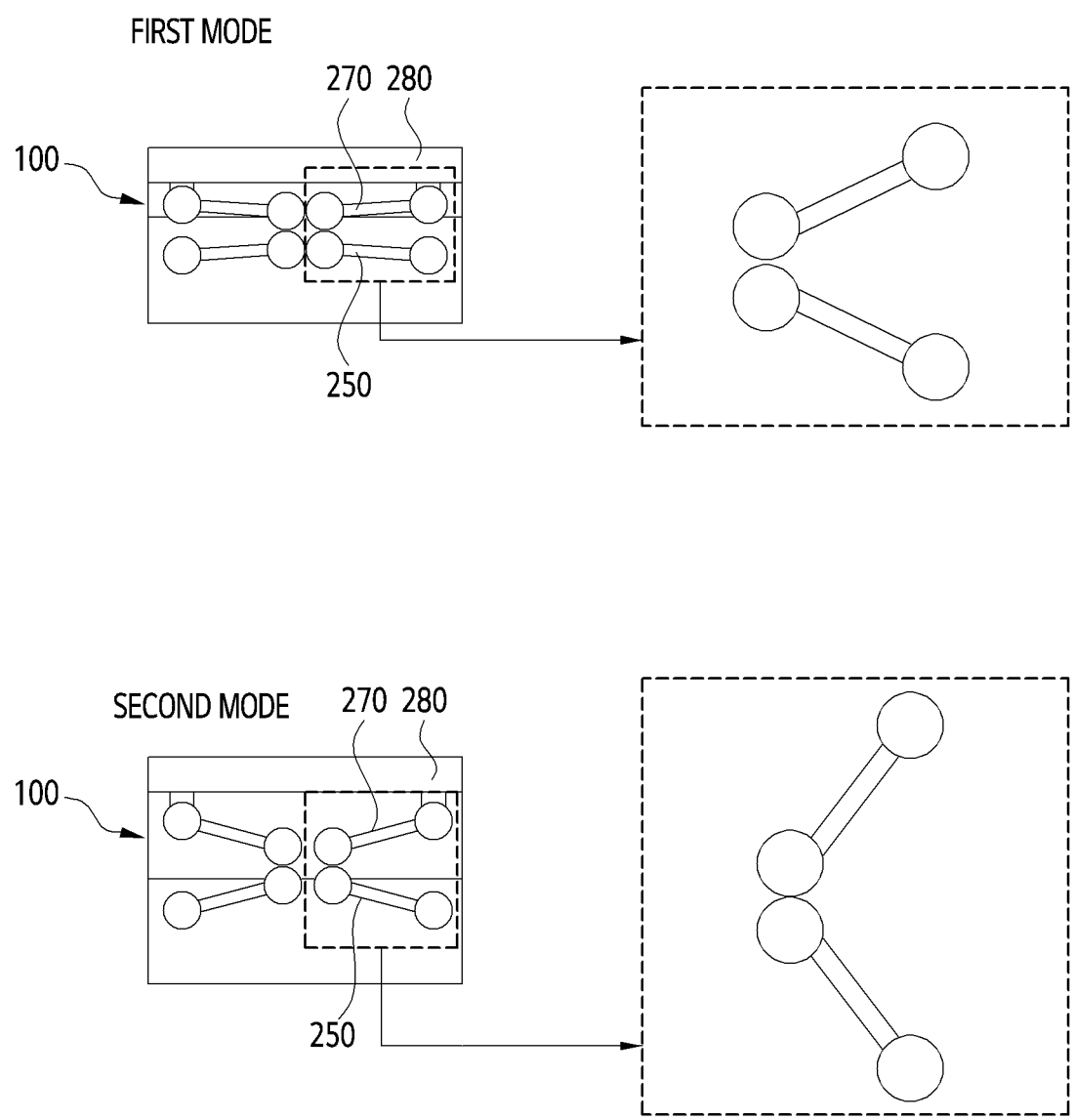
Figure 14C:
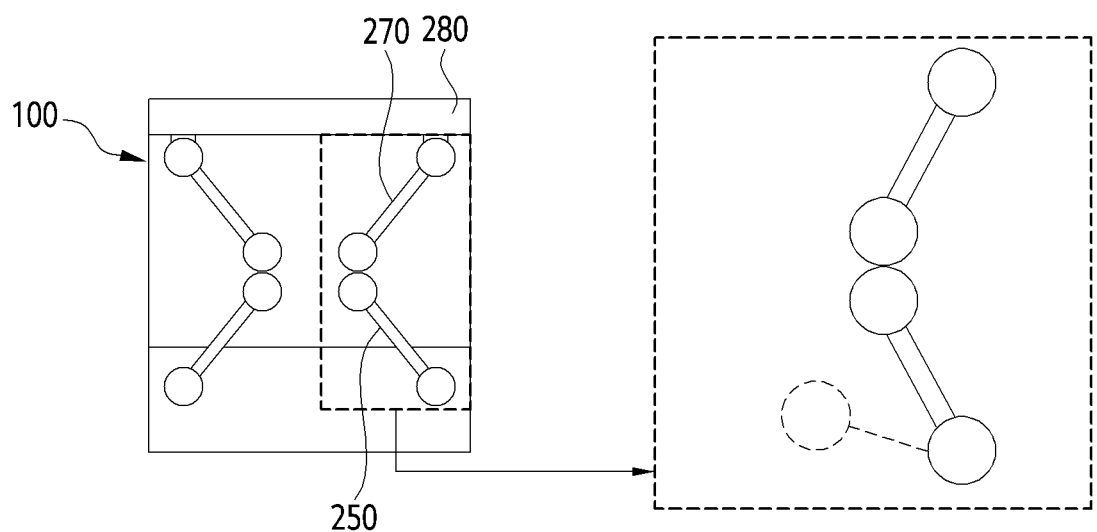
Figure 14C:
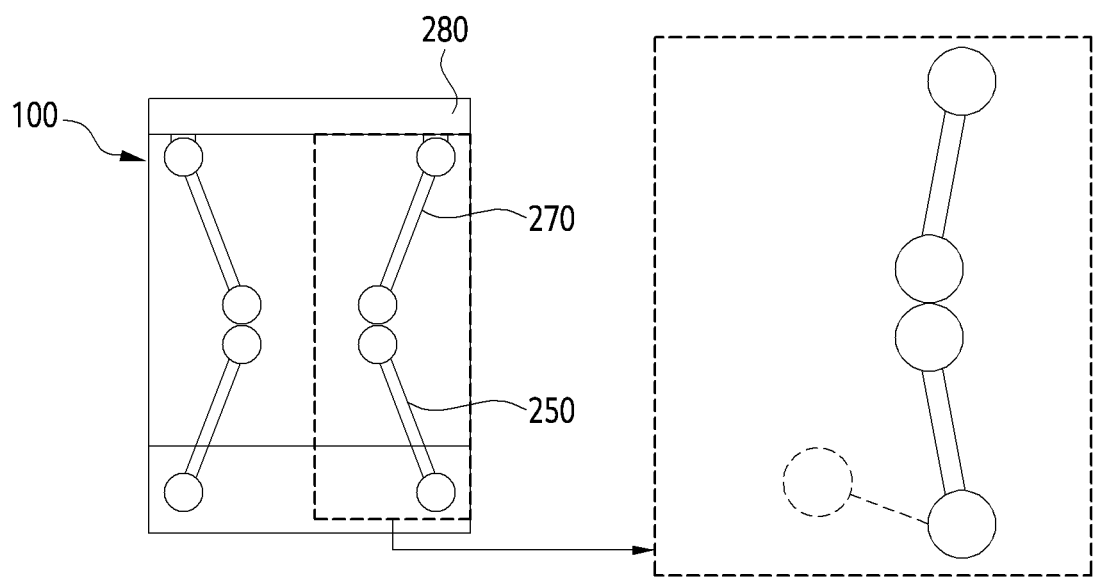

FIGS. 13(*a*) and 13(*b*) are a diagram for illustrating exposure control of a display based on rotation of the display winder 400.

Referring to (a) of FIG. 13, the plurality of sensors 472 are fixed at positions capable of sensing the rotation of the rotating drum 410. In the present embodiment, the plurality of sensors 472 may be fixed to an inner side surface of the casing positioned adjacent to the rotating drum 410. That is, the sensor 472 does not rotate together with the rotating drum 410.

The sensing portion 474 may be connected to the rotating drum 410 and rotate together, and a shape of the sensing portion 474 may be formed such that a sensing state of one of the plurality of sensors 472 and a sensing state of the other sensors are different from each other. For example, when the plurality of sensors 472 are composed of a first sensor, a second sensor, a third sensor, and a fourth sensor, when a recognition state of the first sensor is 'on' by the sensing portion 474, a recognition state of the second to fourth sensors is 'off'. Conversely, the recognition state of the first sensor may not 'off,' and the recognition state of the second to fourth sensors may be 'on.' In the present embodiment, the sensing portion 474 is formed as a wheel cap that covers an end surface of the rotating drum 410, and the wheel cap includes a hole 476 defined therein that the sensor 472 may recognize. In addition, the sensor 472 may include a photosensor.

When the rotating drum 410 rotates, a position of the hole 476 rotates around the rotation shaft together. When the hole 476 passes one of the sensors 472, the corresponding sensor recognizes the hole 476, thereby sensing the rotational state of the rotating drum 410. Accordingly, when the rotational state of the rotating drum 410 is divided into modes, an exposure range of the display unit 100 may be controlled.

Referring to (b) of FIG. 13, a first mode, as a state in which the display unit 100 is retracted, is a state in which the rotating drum 410 winds the display unit 100 to the maximum. When a second mode is executed by selection of the user, the display driver 200 operates the motor 210 to extend the display unit 100, and the rotating drum 410 rotates accordingly.

When the display unit 100 is exposed in the second mode state, the plurality of sensors 472 may recognize that the second mode is activated by the sensing portion 474 rotated together with the rotating drum 410. That is, a sensing state of one of the plurality of sensors 472 indicating the second mode and a sensing state of the other sensors become different from each other. Accordingly, the display device 1000 may recognize that the second mode state is activated and may stop the operation of the motor 210.

In a third mode, the display unit 100 is more exposed than in the second mode. When the third mode is executed by the selection of the user, the display driver 200 operates the motor 210 to further extend the display unit 100. When the sensor recognition unit 470 recognizes that the third mode state is activated, the operation of the motor 210 may be stopped.

In the same manner, the display device 1000 may perform control such that an exposure degree of the display unit 100 varies based on various modes. An exposure mode of the display unit 100 may be divided into four modes, with the state in which the display unit 100 is fully retracted into the casing as a first mode and the state in which the display unit 100 is fully extended as a fourth mode. The modes may be distinguished based on a type and a function of information displayed on the display 110. For example, a third mode may be used in a navigation screen, and the fourth mode may be used when executing a video or a game.

Referring to (a) in FIG. 14, exposure degrees of the display unit 100 are shown based on the first to fourth modes.

(b) and (c) in FIG. 14 are numerical representations of states of the first driving arm 250 and the second driving arm 270 in each exposure mode. In the second to fourth modes, a portion indicated by a dotted line indicates an initial state (the first mode).

Figure 15:
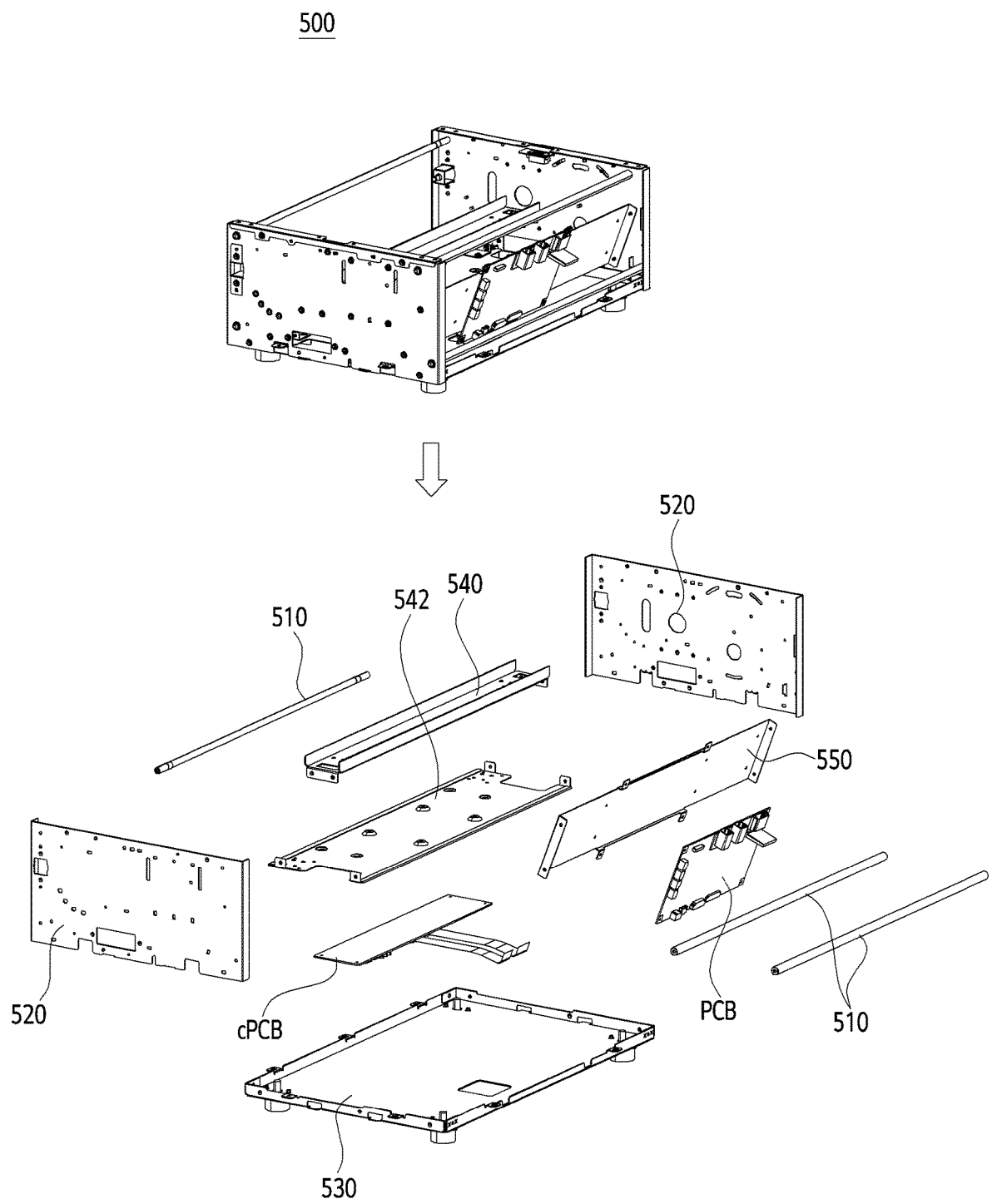
FIG. 15 is an exploded view of a parts fixing portion of a display device.

FIG. 15 is an exploded view of the parts fixing portion 500 of the display device 1000.

The parts fixing portion 500 is located within the casing, and includes a frame, a rod, and the like for fixing the above-described components to specific positions or maintaining the shape of the case. The parts fixing portion 500 may include a spacing adjusting rod 510, the side fixing frame 520, the bottom fixing frame 530, a first driver support frame 540, a second driver support frame 542, and a PCB support frame 550. In the parts fixing portion 500, the frame may fix the cPCB and the main PCB.

The spacing adjusting rod 510 is a rod disposed in the left and right horizontal direction within the casing. The spacing adjusting rod 510 may include a plurality of spacing adjusting rods, and may be disposed at an appropriate position to fix the shapes of the frames.

The side fixing frame 520 is a plate-shaped frame located within the casing and adjacent to a left or right side surface of the casing, and the bottom fixing frame 530 is a plate-shaped frame located within the casing and adjacent to a bottom surface of the casing.

The first driver support frame 540 and the second driver support frame 542 are frames disposed to support or fix the components corresponding to the display driver 200.

The PCB support frame 550 is a frame disposed to fix the PCB.

A material of the parts fixing portion 500 may include the Steel Electrolytic Cold Commercial (SECC) or the SUS.

FIGS. 16 to 20 are diagrams for illustrating a display device 2000 according to another embodiment of the present disclosure.

Figure 16:
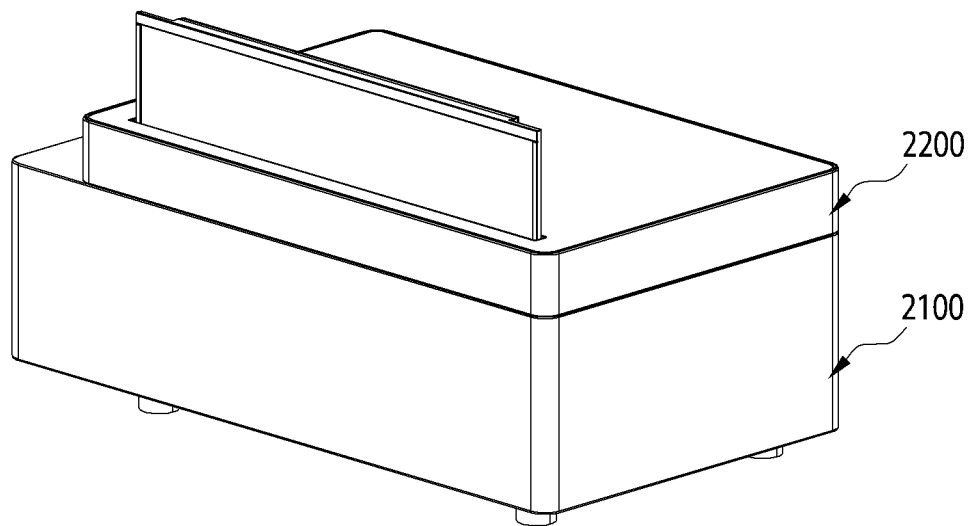
FIG. 16 is a front perspective view of a flexible display device for a vehicle according to another embodiment of the present disclosure.
Figure 17:
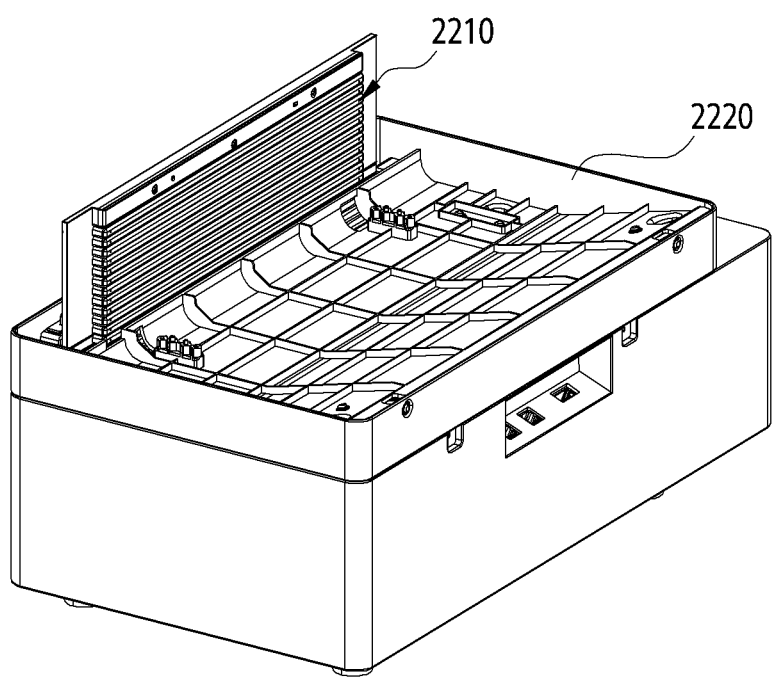
FIG. 17 is a rear perspective view of a flexible display device for a vehicle according to another embodiment of the present disclosure.
Figure 18:
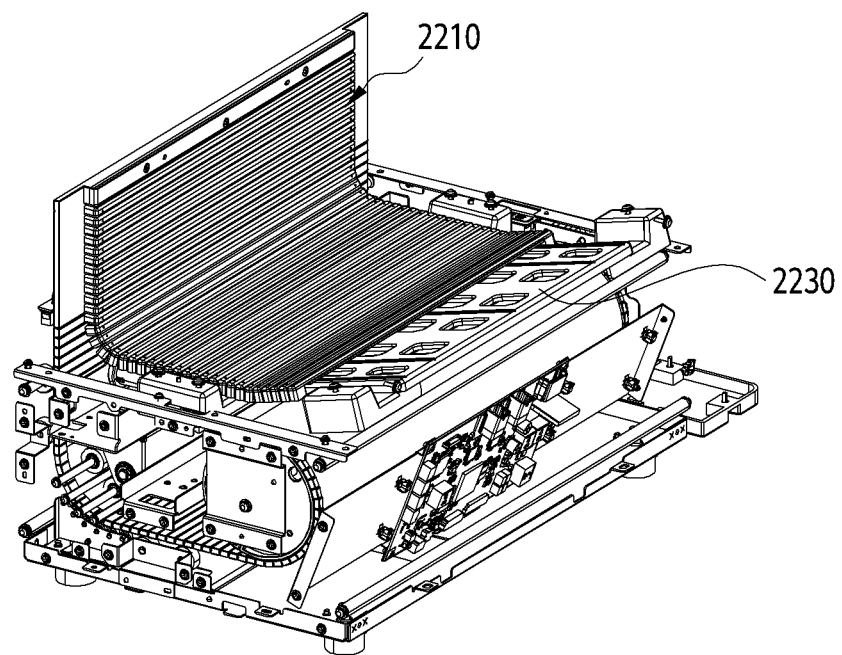
FIG. 18 is a rear perspective view of an interior of a casing of a flexible display device for a vehicle according to another embodiment of the present disclosure.

FIG. 16 is a front perspective view of the display device 2000, and FIG. 17 is a rear perspective view of the display device 2000 from which an upper cover is removed. FIG. 18 is a rear perspective view of an interior of a casing of the display device 2000.

The display device 2000 according to another embodiment of the present disclosure is different from the display device 1000 described above in that the display device 2000 further includes a rear cover 2200. In describing the display device 2000, components the same as those of the above-described display device 1000 will be described using the same reference numerals.

The rear cover 2200 may cover the rear surface of the display unit 100 and the display driver (the first driving arm, the second driving arm, and the like) 200 exposed to the outside so as to protect the components and improve aesthetics of the device.

Figure 19:
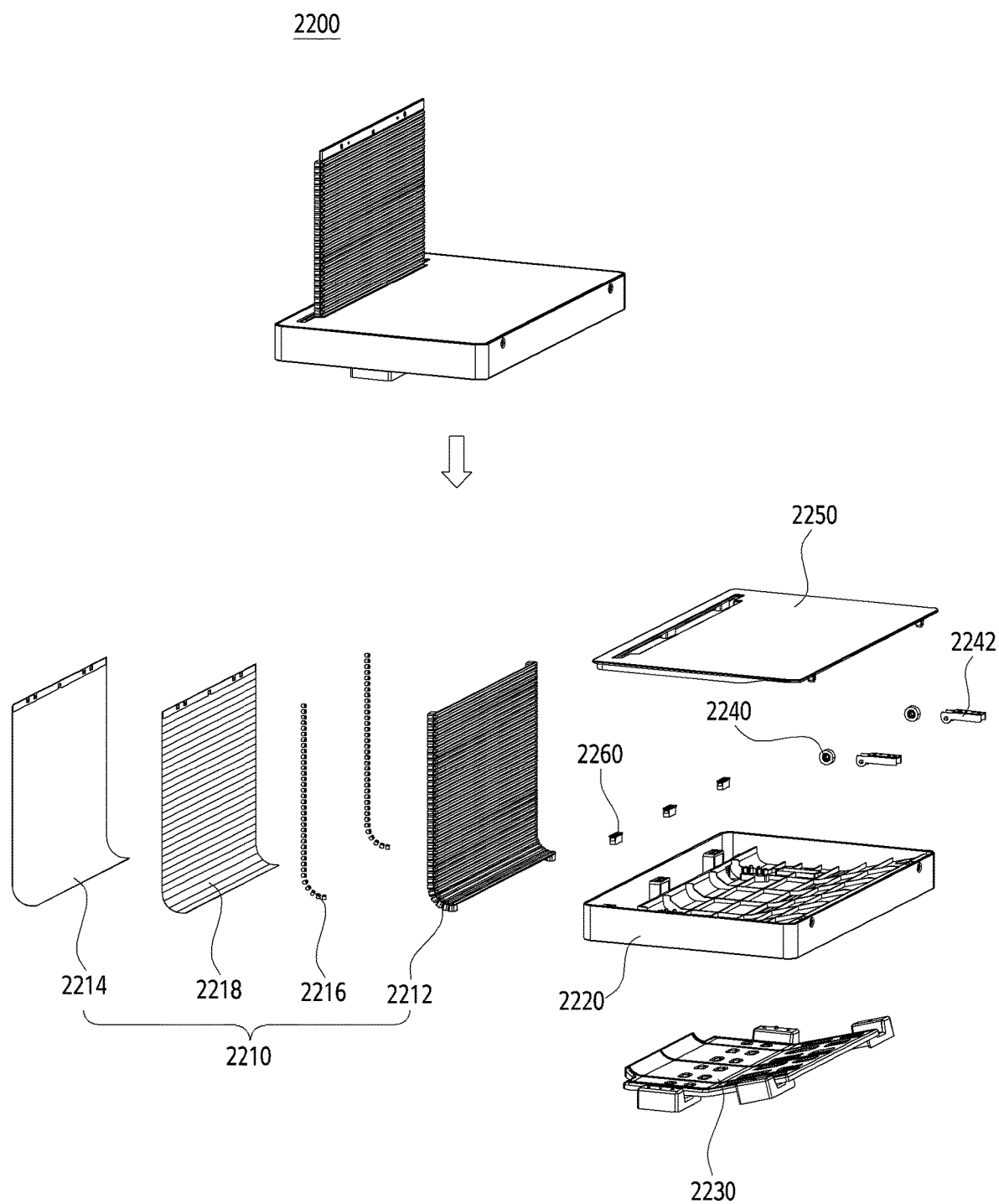
FIG. 19 is an exploded view of a rear cover of a flexible display device for a vehicle according to another embodiment of the present disclosure.

FIG. 19 is an exploded view of the rear cover 2200 of the display device 2000.

The rear cover 2200 may include a rear protective cover 2210, an upper cover guide 2220, and a lower cover guide 2230.

The rear protective cover 2210 is detachable from the rear surface of the display unit 100 and covers the exposed rear surface of the display unit 100.

The rear protective cover 2210 may include a rear surface detachable cover 2212, a magnetic portion 2216, a double-sided adhesive portion 2218, and a cover reinforcing sheet 2214.

The rear surface detachable cover 2212 is a cover that protects an exposed portion of the rear surface of the display unit 100 or the display driver 200. The rear surface detachable cover 2212 may be composed of a plurality of covers having a great length in the horizontal direction and a small length in the vertical direction. The plurality of covers may be attached to one surface of the cover reinforcing sheet 2214 via the double-sided adhesive portion 2218. The double-sided adhesive portion 2218 may include a double-sided tape such as the FOAM tape. A width of the plurality of covers constituting the rear surface detachable cover 2212 may be equal to or smaller than the width of the display unit 100. A vertical dimension of the plurality of covers may be appropriately designed by the person skilled in the art to a vertical dimension that may flexibly respond to the bending.

The rear surface detachable cover 2212 may further include the magnetic portions 2216 at both distal ends thereof in the horizontal direction, respectively. The magnetic portion 2216 contains a magnet to be detachably attached to the display unit 100. The display cover 130 of the display unit 100 may have the magnetic portions 160 at both of the left and right ends thereof, and the magnetic portion 160 of the display cover 130 and the magnetic portion 2216 of the rear surface detachable cover 2212 may be correspondingly attached to or detached from each other by the magnet.

Each of the display cover 130 of the display unit 100 and the rear protective cover 2210 may include a plurality of magnets arranged in the vertical direction (or the retraction/extension direction of the display unit) at positions where the display cover 130 of the display unit 100 and the rear protective cover 2210 correspond to each other. The rear protective cover 2210 is separated from the display unit 100 when the display unit 100 is retracted into the casing, and is magnetically attached to the exposed portion of the display unit 100 when the display unit 100 is extended from the casing.

Figure 20:
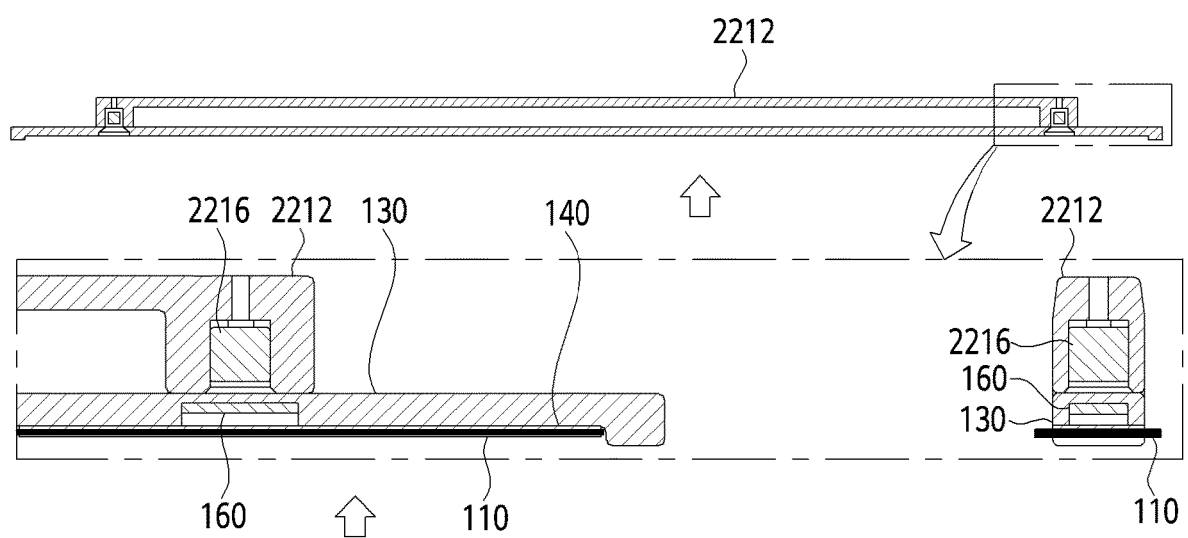
FIG. 20 shows a connection portion between a rear protective cover and a display unit.

FIG. 20 is a detailed cross-sectional view of a connection portion between the rear protective cover 2210 and the display unit 100. As shown in FIG. 20, the magnetic portions 2216 are respectively disposed at both of the left and right ends of the rear surface detachable cover 2212, and positions thereof respectively correspond to positions of the magnetic portions 160 disposed on the display cover 130.

In one example, the upper cover guide 2220 and the lower cover guide 2230 are components for guiding the rear protective cover 2210 separated from the display unit 100. The upper cover guide 2220 is in contact with an outer surface of the rear protective cover 2210 to guide the rear protective cover 2210, and the lower cover guide 2230 is in contact with an inner surface of the rear protective cover 2210 to guide the rear protective cover 2210. That is, a movement of the separated rear protective cover 2210 is guided along a space between the upper cover guide 2220 and the lower cover guide 2230. The display device 2000 may have an internal space for embedding the rear protective cover 2210 therein at an upper portion thereof, and the rear protective cover 2210 may be extended from the casing or retracted into the casing.

The upper cover guide 2220 and the lower cover guide 2230 may have a flat plate shape including a curved surface. The rear protective cover 2210 may be guided along a curvature of the surface between a bottom surface of the upper cover guide 2220 and a top surface of the lower cover guide 2230.

In addition, the rear cover 2200 may further include a cover guide roller 2240 fixed within the casing to guide the rear protective cover 2210 and a bracket 2242 for supporting the cover guide roller 2240.

The casing of the rear cover 2200 may further include an upper cover 2250 and a cover fixture 2260 for fixing the upper cover 2250.

A material of the rear surface detachable cover 2212 may include polycarbonate (PC) or aluminum. A material of the cover reinforcing sheet 2214 may include polyethylene terephthalate (PET). Materials of the upper cover guide 2220, the lower cover guide 2230, and the upper cover 2250 may include acrylonitrile butadiene styrene (ABS). A material of the cover guide roller 2240 may include rubber, and a material of the bracket 2242 may include the Steel Electrolytic Cold Commercial (SECC).

The rear cover 2200 has a structure that may be disassembled from or assembled in the display device 2000, so that whether to apply the rear cover 2200 may be selected based on preference of the user or a vehicle environment.

According to embodiments of the present disclosure, there is an effect of reducing a volume of the device required to accommodate the display as the flexible display is retracted into or extended from the casing in the winding scheme. In addition, the exposure range of the display may be controlled by the sensor recognition method applied suitable for the scheme of winding the display, and effectiveness of the display device is improved. As the exposure range of the display is controlled, the screen may be output on only the exposed region, and power consumption due to the use of the display may be reduced.

The display device according to the embodiments may be applied to various positions such as a center of the vehicle, a passenger display, a center console display, a rear seat entertainment display, a rear center display, and a rear control display.

The description of each of the various embodiments of the present disclosure is not limited only for the corresponding embodiment, and it is understood that the technical idea for each embodiment applied in the various embodiments may be applied to the other embodiments as well.

The detailed descriptions of the preferred embodiments of the present disclosure disclosed as described above have been provided to enable those skilled in the art to implement and practice the present disclosure. Although described above with reference to the preferred embodiments of the present disclosure, those skilled in the art will be able to understand that the present disclosure may be variously modified and changed without departing from the scope of the present disclosure. For example, those skilled in the art may use the components described in the above-described embodiments in a manner of combining the components with each other.

Accordingly, the present disclosure is not intended to be limited to the embodiments described herein, but is to be accorded the widest scope consistent with the principles and novel features disclosed herein

What is claimed is:

1. A flexible display device for a vehicle, comprising:
   a casing having an inner space and an opening exposing the inner space;
   a display unit stored at the inner space of the casing and configured to extend out from and retract into the casing through the opening;
   a display driver configured to move the display unit;
   a display winder configured to wind the display unit based on a movement of the display unit; and
   a guide positioned within the casing and configured to guide the movement of the display unit,
   wherein the guide includes a curvature guide configured to shape a moving path of the display unit to have a radius of curvature.

2. The flexible display device of claim 1, wherein the display unit includes:
   a flexible display;
   a flexible connecting sheet having a first side connected to the flexible display and a second side connected to the display winder, and configured to be wound by the display winder; and
   a display cover attached to a rear surface of the flexible display and the flexible connecting sheet.

3. The flexible display device of claim 2, wherein the moving path of the display unit has a radius of curvature ranging between about 30 mm and about 70 mm.

4. The flexible display device of claim 3, wherein the display driver includes:
   a motor disposed at the casing and configured to rotate to move the display unit;
   a worm gear assembly connected to the motor and having a rotation axis parallel to that of the motor; and
   a worm wheel assembly connected to the worm gear assembly and having a rotation axis perpendicular to that of the motor.

5. The flexible display device of claim 4, wherein the display driver is pivoted by the worm wheel assembly and includes a first driving arm having a first end connected to the worm wheel assembly and a second end connected to the display unit.

6. The flexible display device of claim 5, wherein:
   the display driver further includes a second driving arm having a first end connected to the second end of the first driving arm and a second end connected to the display unit, and
   the first and second driving arms are configured to pivot with respect to a same plane but in mutually opposed directions, respectively.

7. The flexible display device of claim 6, wherein:
   the display unit further includes an upper fixing plate in contact with an upper end portion of a rear surface of the flexible display, and
   the upper fixing plate includes a guide unit configured to guide the first or second driving arm, and a width of the upper fixing plate is equal to or greater than that of the flexible display.

8. The flexible display device of claim 4, wherein the display winder includes:
   a rotating drum configured to wind the display unit on an outer circumferential surface of the rotating drum; and
   a rotation sensor configured to sense a rotation status of the rotating drum.

9. The flexible display device of claim 8, wherein the rotating drum has a rotation spring configured to exert an elastic force in a winding direction of the display unit.

10. The flexible display device of claim 8, wherein the rotation sensor includes:
    a sensing portion configured to rotate together with the rotating drum; and
    a plurality of sensors configured to sense rotation of the sensing portion.

11. The flexible display device of claim 8, wherein an external exposure range of the display unit is controlled based on the sensed rotation status of the rotating drum.

12. The flexible display device of claim 8, wherein the display driver is configured to control the motor based on the sensed rotation status of the rotating drum.

13. The flexible display device of claim 2, further comprising a rear protective cover covering a rear surface of the display unit and configured to be detachable from the rear surface of the display unit.

14. The flexible display device of claim 13, wherein each of the display cover of the display unit and the rear protective cover includes a plurality of magnets configured to detachably attach the rear protective cover to the display unit.

15. The flexible display device of claim 14, wherein the rear protective cover is configured to be separated from the display unit when the display unit is retracted into the casing.

16. The flexible display device of claim 1, wherein the display unit comprises a plastic organic light-emitting diode (POLED).

17. The flexible display device of claim 1, wherein the curvature guide includes a front surface curvature guide in contact with a front surface of the display unit and a rear surface curvature guide in contact with a rear surface of the display unit.

18. The flexible display device of claim 17, wherein each of the front and rear surface curvature guides includes a plurality of rollers.

* * * * *